US007881521B2

(12) United States Patent
Kaku et al.

(10) Patent No.: US 7,881,521 B2
(45) Date of Patent: Feb. 1, 2011

(54) ROTATIONAL IMAGE GENERATION METHOD, PROGRAM, AND INFORMATION STORAGE MEDIUM AND VIRTUAL CAMERA

(75) Inventors: Ryoichi Kaku, Fujisawa (JP); Manabu Okano, Kawasaki (JP); Makiko Gotoh, Kamakura (JP)

(73) Assignee: Namco Bandai Games Inc., Tokyo (JP)

( * ) Notice: Subject to any disclaimer, the term of this patent is extended or adjusted under 35 U.S.C. 154(b) by 981 days.

(21) Appl. No.: 10/808,424

(22) Filed: Mar. 25, 2004

(65) Prior Publication Data
US 2004/0246250 A1 Dec. 9, 2004

(30) Foreign Application Priority Data
Mar. 31, 2003 (JP) .............................. 2003-094489

(51) Int. Cl.
*G06K 9/00* (2006.01)
(52) U.S. Cl. .................................................. 382/154
(58) Field of Classification Search ................. 382/154, 382/276, 308; 345/419, 427, 619, 581, 582, 345/629, 649; 463/31
See application file for complete search history.

(56) References Cited

U.S. PATENT DOCUMENTS 6,831,659 B1 * 12/2004 Mukoyama et al. ......... 345/619

2002/0135603 A1 * 9/2002 Nakagawa et al. .......... 345/690
2003/0207704 A1 * 11/2003 Takahashi et al. ............... 463/1

FOREIGN PATENT DOCUMENTS

JP A 2002-24858 1/2002

OTHER PUBLICATIONS

Kikuchi; (2002); "Java3D Polygon Game Training: Fifth Installment"; JAVA Developer; No. 5; pp. 124-129.
Nakazawa, et al.; (2001) "High Speed 3-Dimensional Tree Image Drawing Method Using Level of Detail"; IEICE Technical Report; vol. 101; No. 421; pp. 167-174.
Bothcy; (2000); "Speed-up Techniques and Thinking Routine for 3D Game Found from Source Code of a 3D Game "Doom""; C Magazine; pp. 42-53.

* cited by examiner

*Primary Examiner*—Brian Q Le
*Assistant Examiner*—Edward Park
(74) *Attorney, Agent, or Firm*—Oliff & Berridge, PLC

(57) ABSTRACT

A model object MOB (tree) having a plurality of part objects (branches) POB1 and POB2 each of which has a projection shape is arranged in an object space. Each of the POB1 and POB2 has a projecting portion formed on a display surface on which an image is drawn. The POB1 and POB2 are rotated so that the display surfaces thereof are directed toward a virtual camera VC. A Z texture for setting bump shapes on the display surfaces by pixel unit or forming a virtual projection shape on each of the display surfaces is mapped on the POB1 and POB2. When the VC rotates about a Y-axis and an X-axis while being directed toward a column-shaped part object (trunk) COB, the POB1 and POB2 are rotated so that the display surfaces thereof are directed toward the VC.

15 Claims, 20 Drawing Sheets

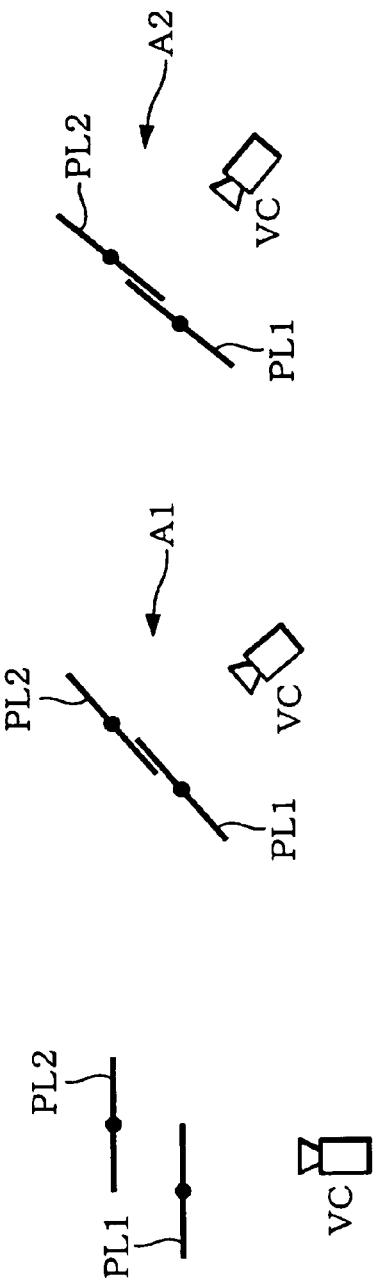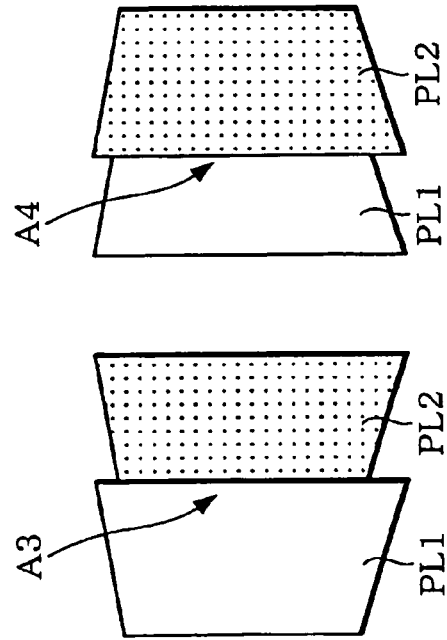
FIG. 2A
FIG. 2B

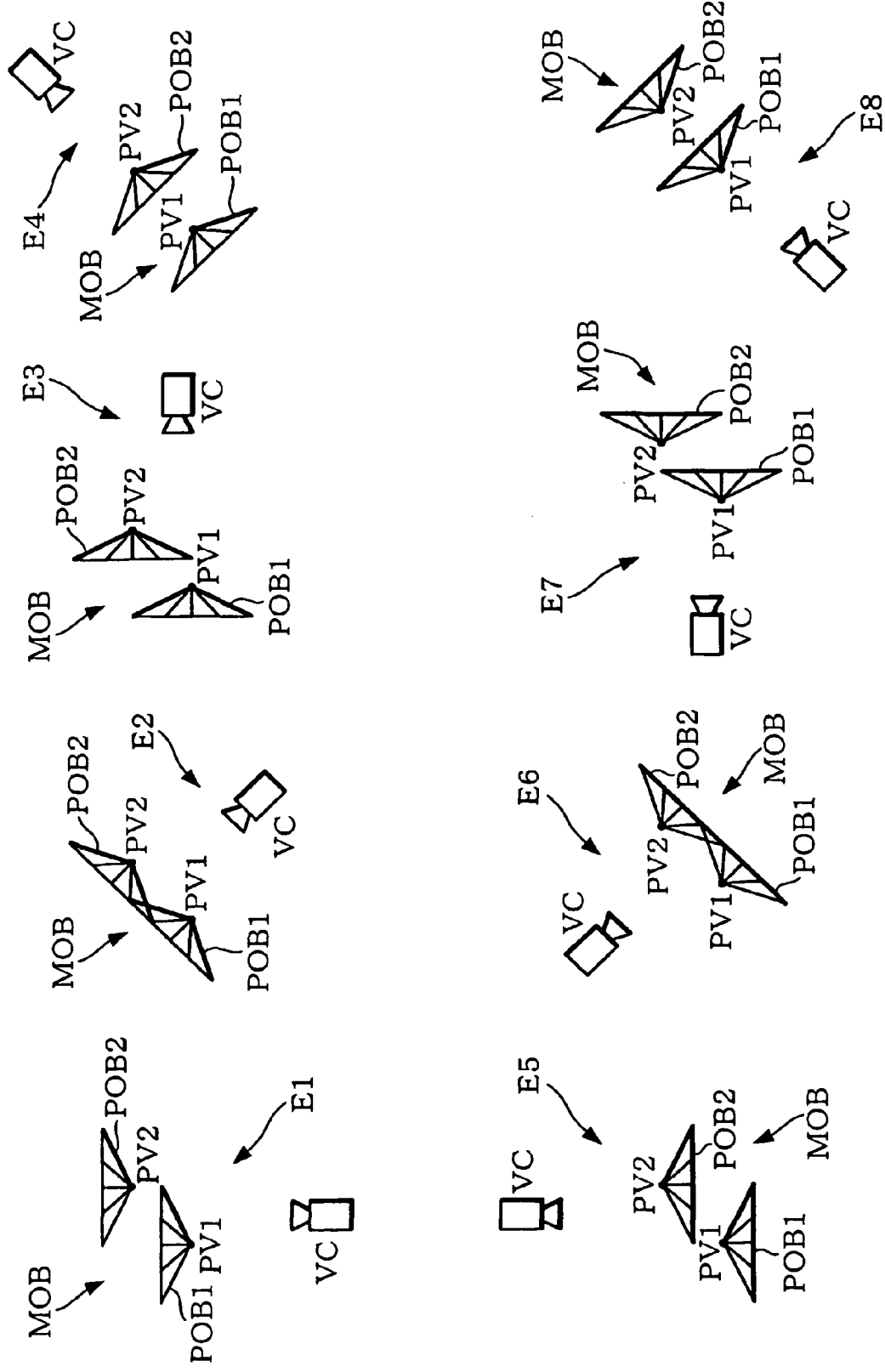

WITHOUT Z-TEXTURE MAPPING

WITH Z-TEXTURE MAPPING

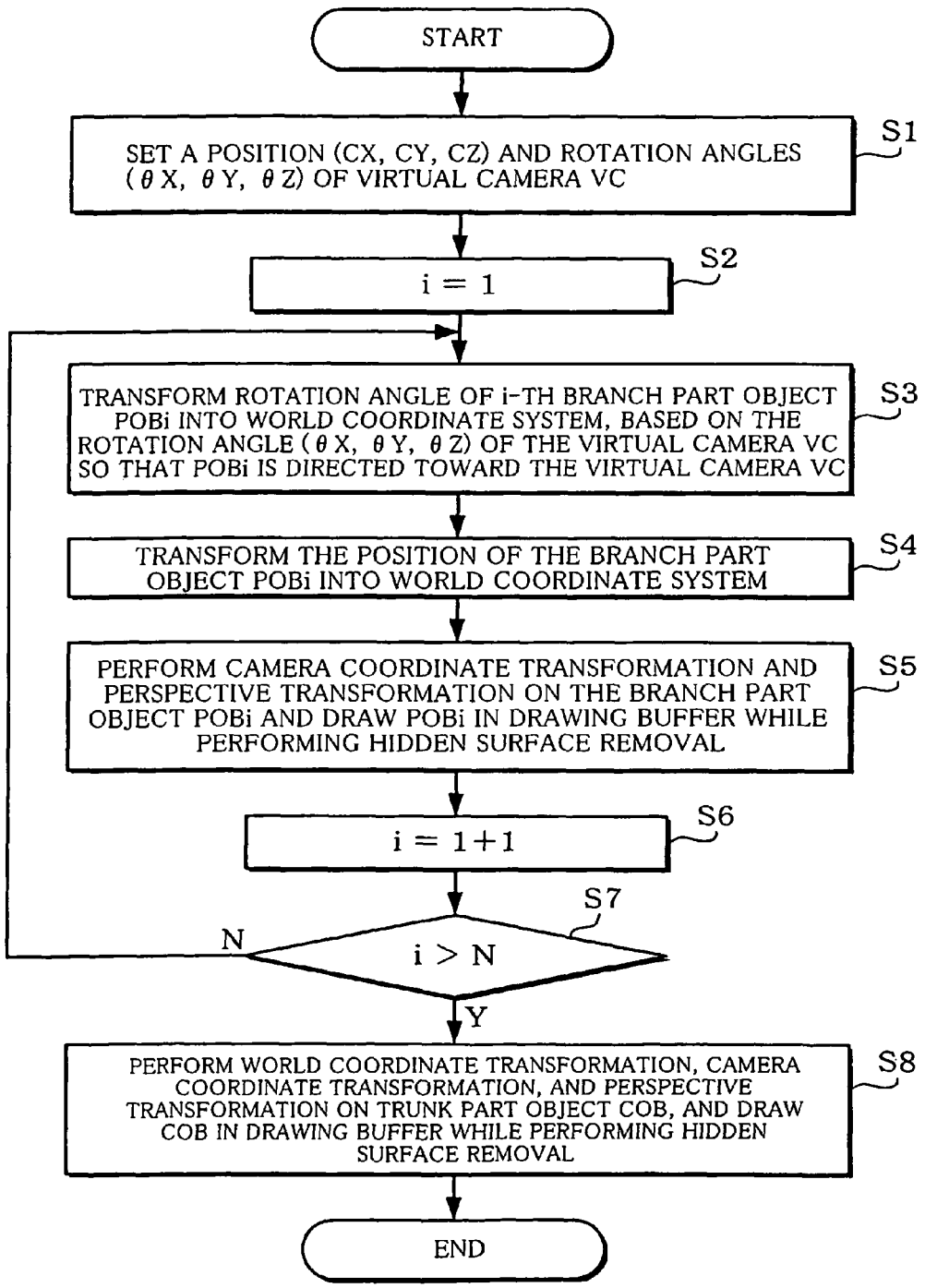

FIG.18

OBJECT DATA

| BRANCH PART OBJECT | X | Y | Z | θX | θY | θZ | OBJECT NUMBER |
|---|---|---|---|---|---|---|---|
| POB1 | X1 | Y1 | Z1 | θX1 | θY1 | θZ1 | OBN1 |
| POB2 | X2 | Y2 | Z2 | θX2 | θY2 | θZ2 | OBN2 |
| ⋮ | ⋮ | ⋮ | ⋮ | ⋮ | ⋮ | ⋮ | ⋮ |
| POBN | XN | YN | ZN | θXN | θYN | θZN | OBNN |

ROTATIONAL IMAGE GENERATION METHOD, PROGRAM, AND INFORMATION STORAGE MEDIUM AND VIRTUAL CAMERA

Japanese Patent Application No. 2003-94489, filed on Mar. 31, 2003, is hereby incorporated by reference in its entirety.

BACKGROUND OF THE INVENTION

The present invention relates to an image generation method, program and information storage medium.

In the prior art, an image generating system (or game system) for generating an image visible from a virtual camera (or a given viewpoint) in an object space which is a virtual three-dimensional space is known. It is highly popular as a method by which a so-called virtual reality can be experienced. In such an image generating system, it is desired that even plants including trees can realistically be represented (see Japanese Patent Application Laid-Open No. 2002-24858).

However, a conventional L system required a complicated process to generate images of trees (which, in a broad sense are plants).

A technique of representing a tree by fixedly arranging dome-shaped branch part objects around the trunk part object in all directions may be conceived. However, so many branch part objects are generated with such a technique that substantial storage capacity of a memory is required.

Another technique of representing a tree by mapping image textures of the tree on a flat plate-shaped polygon, which is known as "billboard" technique may also be conceived. In such a "billboard" technique, however, if the hidden surface removal is carried out by Z buffer, the moment when a flat plate-shaped polygon is positionally replaced by another flat plate-shaped polygon will be noticeable. This will degrade the generated image.

BRIEF SUMMARY OF THE INVENTION

According to one aspect of the present invention, there is provided an image generation method for generating an image comprising:

storing object data in an object data storage section;

disposing a plurality of objects in an object space, based on the object data stored in the object data storage section;

controlling a virtual camera; and generating an image viewed from the virtual camera in the object space while performing hidden surface removal processing, the method further comprising:

disposing in the object space a model object including a plurality of part objects each of which has a projection shape, each of the part objects having a projecting portion formed on a display surface on which an image is drawn; and rotating each of the part objects based on rotational information of the virtual camera so that the display surface of each of the part objects is directed toward the virtual camera.

According to another aspect of the present invention, there is provided an image generation method for generating an image comprising:

storing object data in an object data storage section;

disposing a plurality of objects in an object space, based on the object data stored in the object data storage section;

storing a Z texture in which an offset value of a Z-value is set on each texel in a texture storage section;

mapping the Z texture stored in the texture storage section on each of the objects;

controlling a virtual camera; and generating an image viewed from the virtual camera in the object space while performing hidden surface removal processing, the method further comprising:

disposing a model object having a plurality of part objects in the object space;

rotating each of the part objects based on rotational information of the virtual camera so that a display surface of each of the part objects on which an image is drawn is directed toward the virtual camera; and mapping on each of the part objects the Z texture for forming a virtual projection shape on the display surface of the part objects.

BRIEF DESCRIPTION OF THE SEVERAL VIEWS OF THE DRAWING

FIGS. 2A and 2B illustrate a technique using a flat plate-shaped polygon.

FIG. 14 illustrates an arrangement of part objects.

FIG. 17 is a flow chart illustrating an example of a process according to an embodiment of the present invention.

FIG. 18 is an example of object data structure.

DETAILED DESCRIPTION OF THE EMBODIMENT

Embodiments are described below.

Note that the embodiments described below do not limit the scope of the invention defined by the claims laid out herein. Similarly, the overall configuration of the embodiments below should not be taken as limiting the subject matter defined by the claims herein.

1. Configuration

Figure 1:
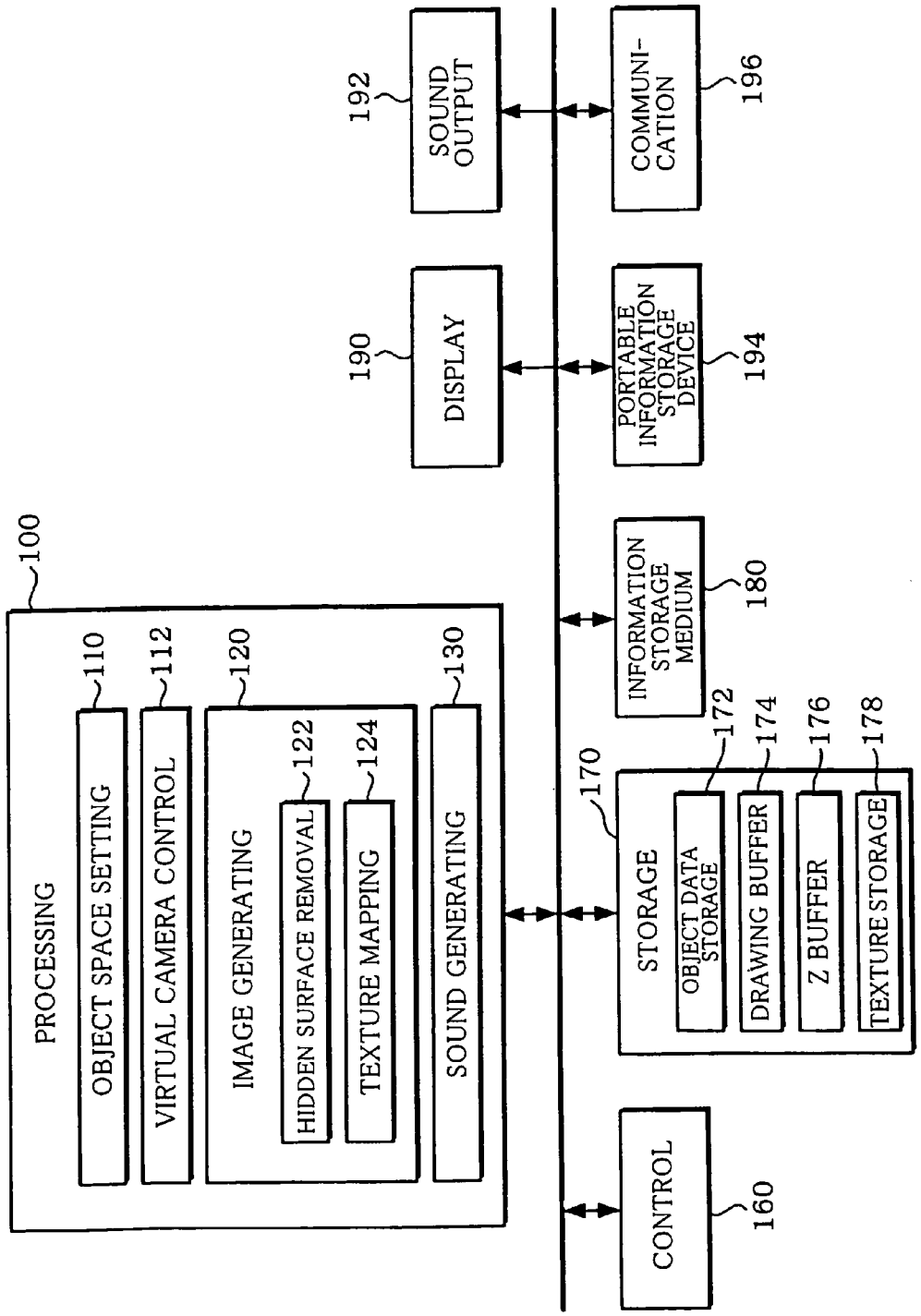
FIG. 1 is a functional block diagram of an image generating system according to an embodiment of the present invention.

FIG. 1 shows a functional block diagram of an image generating system (or game system) according to this embodiment. However, the image generating system is not necessarily required to include all the components (or sections) shown in FIG. 1, but may be configured to omit at least one section (e.g., a control section 160, a portable information storage device 194 or a communication section 196).

The control section 160 is used for a player to input operation data, and its function can be realized by any one of various hardware pieces such as a lever, a button, a steering wheel, a shift lever, an accelerator pedal, a brake pedal, a microphone, a sensor, a touch panel type display and a housing.

A storage section 170 provides a work area for the processing section 100 and a communication section 196, and its function being able to be realized by hardware such as RAM.

An information storage medium 180 (or a computer-readable medium) is to store a program or data, and its function can be realized by hardware such as an optical disc (CD or DVD), a magnetic optical disc (MO), a magnetic disc, a hard disc, a magnetic tape or a memory (ROM). A processing section 100 is designed to perform various kinds of processes according to this embodiment, based on programs (or data) which have been stored in this information storage medium 180. In other words, the information storage medium 180 has stored (or recorded) a program for causing a computer to function various sections according to this embodiment or a program for causing a computer to execute the processing in each of the sections.

A display section 190 is to output an image generated according to this embodiment, and its function can be realized by hardware, for example, CRT, LCD, a touch panel type display, HMD (head mount display) or the like.

A sound output section 192 is to output a sound generated according to this embodiment, and its function can be realized by hardware, for example, a loud speaker, a headphone or the like.

A portable information storage device 194 is designed to store a player's personal data or to save data relating to a game and may be of any form such as a memory card or a portable game device.

The communication section 196 is designed to perform various controls for communicating the present image generating system to any other system (e.g., a host device or other image generating systems), and its function can be realized by hardware, for example, various processors or communicating ASIC or any suitable control program.

The program (or data) for causing the computer to function as the respective sections (or means) according to this embodiment may be distributed from the information storage medium possessed by the host device (or server) through a network and the communication section 196 into the information storage medium 180 (or storage section 170). Use of the information storage medium in such a host device (or server) may be also included within the scope of the present invention.

The processing section (or processor) 100 is designed to perform various processing for game, image generation or sound generation, based on the operation data and programs from the control section 160. The game processes executed by the processing section 100 may include a process of starting the game only when a game start condition (selection of a course, a map, a character, or number of players, or the like) is satisfied, a process of advancing the game, a process of arranging various objects including the selected character and map in place, a process of displaying the objects, a process of computing the game results and a process of finishing the game only when a game termination condition is satisfied or other processes. The processing section 100 performs various processes by using the storage section 170 as a work region. The functions of this processing section 100 can be realized by hardware such as various processors (CPU, DSP and the like) or ASIC (gate array or the like) or a program (or game program).

The processing section 100 comprises an object space setting section 110, a virtual camera control section 112, an image generating section 120 and a sound generating section 130. However, at least one of these sections may be omitted.

The object space setting section 110 arranges and sets, in an object space, various objects representing characters, trees, cars, columns, walls, buildings, maps (landforms) and others to be displayed (i.e., objects each of which is configured by polygons, free-form surfaces or primitive faces such as sub-division surfaces). That is to say, the object space setting section 110 determines the position and rotation angle (or orientation or direction) of an object in the world coordinate, and arranges that object at that position (on X-, Y- or Z-axis) with that rotation angle (about X-, Y- or Z-axis).

More particularly, the object space setting section 110 reads object data including object positions, object rotation angles, object types (or object numbers) and the like, from the object data storage section 172, and arranges a plurality of objects in the object space, based on the read object data. In this case, the arranging of objects is realized based on the object data (including positions and rotation angles) expressed by the local coordinate system, various matrices for coordinate transformation (world coordinate transformation, camera coordinate transformation or perspective transformation) such as a rotation matrix, a translation matrix, and the like.

For example, the object data may be read out of the information storage medium 180 and loaded into the object data storage section 172 when the image generating system is powered on. Alternatively, the object data may be downloaded from the host device into the object data storage section 172 through the communication section 196 and Internet (which, in a broad sense, is a network).

The object space setting section 110 also performs the movement/action computation of a moving object (e.g., a motorcar, an airplane or a character), for example, a movement/action simulation. That is to say, the object space setting section 110 performs a process of causing the moving object to perform the movement and the action (motion or animation) in the object space, based on the operation data inputted by the player through the control section 160, a program (or movement/action algorithm), various data (motion data) and others. More particularly, the object space setting section 110 performs a simulation for determining the movement information of the moving object (position, rotation angle, speed or acceleration) and the action information (position or rotation angle of each part object) sequentially, for example, for each frame (each 1/60 second).

The virtual camera control section 112 controls a virtual camera for generating an image in the object space as viewed from a given (or any) viewpoint therein. That is to say, the virtual camera control section 112 performs a process of controlling the position (on X-, Y- or Z-axis) or rotation angle (about X-, Y- or Z-axis) of the virtual camera (or a process of controlling the position or direction of the viewpoint in the virtual camera).

For example, if a moving object is to be taken from the rear thereof by the virtual camera, the position or rotation angle (or direction) of the virtual camera is controlled so that it follows the changed position or rotation of the moving body. In this case, the virtual camera can be controlled based on information for the position, rotation angle or speed of the moving body which has been obtained by the object space setting section 110 (or movement/action computing section). Alternatively, the virtual camera may be rotated through a predetermined angle while being moved along a predetermined path of movement. In such a case, the virtual camera is controlled based on virtual camera data used to specify the position (path of movement) and rotation angle of the virtual camera.

The image generating section 120 generates an image based on the results of various processes (game processing) performed in the image processing section 100, the generated image being then outputted toward the display section 190. That is to say, if a so-called three-dimensional game image is to be generated, the coordinate transformation (world coordinate transformation or camera coordinate transformation), clipping processing, perspective transformation or geometry-processing such as light-source computation will first be performed, the processing results being then used to create drawing data (positional coordinates of a vertex in a primitive face, texture coordinates, color data, normal vector or alpha-value). And, based on this drawing data (or primitive face data), the image of the perspective-transformed (or geometry-processed) object (which may consist of one or more primitive faces) is then drawn in a drawing buffer 174 (which may be a frame or work buffer for storing the image information by pixel unit). Thus, an image may be generated in the object space as viewed from the virtual camera (or a predetermined viewpoint).

The image generating section 120 includes a hidden surface removal section 122. The hidden surface removal section 122 uses a Z buffer (depth buffer) 176 which has stored Z-values (or depth information) so as to perform the hidden surface removal through a Z-buffer method (or depth comparison method).

The image generating section 120 also includes a texture mapping section 124. The texture mapping section 124 is to map a texture (or texture data) stored in a texture storage section 178 onto an object (primitive face). More particularly, the texture mapping section 124 uses texture coordinates or the like set (or given) to each of the vertexes of the object (primitive face) to read a texture (or a surface property such as color, luminance, normal line, Z-value, alpha-value or the like) out of the texture storage section 178. The texture mapping section 124 then maps (or projects) the texture consisting of a two-dimensional image or pattern onto the object. In this case, a process of associating texels with pixels or a bi-linear interpolation (or texel interpolation) is carried out therein. Moreover, the texture mapping may be carried out using a lookup table (LUT) for index color texture mapping.

The sound generating section 130 performs sound processing based on the results of various processing at the processing section 100 to generate game sounds such as BGMs, effect sounds or voices, which are in turn outputted toward the sound output section 192.

In this embodiment, the object space setting section 110 arranges a model object (which, in a narrow sense, is a tree object or plant object) formed by part objects (which, in a narrow sense, are branch objects) in the object space. In other words, the model object is set in the object space based on the object data. These part objects are then rotated with their display surfaces (on each of which an image is to be drawn or a texture is to be mapped) being directed toward the virtual camera. This rotation may be carried out based on the rotational information (rotation angle and direction) for the virtual camera. Moreover, each of the part objects is a projection-shape (convex)-object (cone-shaped, pyramid-shaped, or umbrella-shaped object) having a projecting (convex) portion (vertex or ridgeline) formed on the side of the display surface on which the image is to be drawn.

More particularly, the object space setting section (or rotation control section) 110 rotates the part objects in the model object about their coordinate axes as the virtual camera rotates about a given coordinate axis. Further particularly, the object space setting section 110 rotates the part objects about Y-axis (vertical coordinate axis or first coordinate axis in the world coordinate system), based on the rotation angle of the virtual camera about the Y-axis. Moreover, the object space setting section 110 also rotates the part objects about X-axis (coordinate axis perpendicular to the Y-axis, or second coordinate axis), based on the rotation angle of the virtual camera about the X-axis.

In this embodiment, a Z texture (Z texture data) in which offset Z-values (changed values or corrected values) have been set (or stored) is stored in the texture storage section 178. The texture mapping section 124 then reads this Z texture and maps it onto the object.

More particularly, a Z texture used to set bump shapes (which are finer than the projection-shape of the entire part object) on the display surface of a part object by pixel (which is smaller than primitive face unit) is stored in the texture storage section 178. The texture mapping section 124 reads this Z texture, and maps it on each of the part objects forming the model object. Alternatively, a Z texture used to form a virtual projection shape (which is obtained by adding or subtracting offset Z-values to or from the original Z-values in a part object) on the side of the display surface in a flat plate-shaped part object is stored in the texture storage section 178. The texture mapping section 124 then reads this Z texture and maps it on each of the part objects. Alternatively, the Z textures used to form a virtual projecting portion on a part object and to set bump shapes on the display surface of the part object by pixel may be read out and mapped on each of the part objects. Thus, any blink at an intersection between adjacent part objects will not be noticeable.

The image generating system of this embodiment may be dedicated for a single-player mode in which only a single player can play a game or may have a multi-player mode in which a plurality of players can play a game simultaneously, in addition to such a single-player mode.

If a plurality of players play the game, a single terminal may be used to generate game images and game sounds to be provided to these plural players. Alternatively, these game images and sounds may be generated through a plurality of terminals (game machines or cellular phones) which are interconnected through a network (or transmission line, telecommunication line).

2. Techniques According to this Embodiment

The techniques in this embodiment will now be described with reference to the drawing.

2.1. Representation of Tree by Projection-Shaped Part Objects

One of the techniques of representing trees (or plants) is conceivable to be a technique as referred to as billboard. In such a technique, as shown in FIG. 2A, a texture of tree image is mapped on flat plate-shaped polygons PL1 and PL2 which are always faced directly to the front of the virtual camera VC.

In this technique, however, if the position and rotation angle (or direction) of the virtual camera VC are changed as shown by A1 to A2 in FIG. 2A, the moment at which the positional relationship between the polygons PL1 and PL2 is inverted will be noticeable, as shown by A3 and A4 in FIG. 2B. That is to say, the Z-buffer method performs the hidden surface removal based on the Z-values (or depth values). And, at A1 of FIG. 2A, the Z-values of PL1 and PL2 indicate that PL1 is located forward of PL2 whereas at A2, the Z-values of PL1 and PL2 indicate that PL2 is located forward of PL1. Thus, such an instantaneous inversion as shown by A3 and A4 in FIG. 2B will be noticeable. Thus, a player will notice that a tree is represented by plate-shaped polygons PL1 and PL2. This raises a problem in that a high-quality image could not be generated.

Figure 3A:
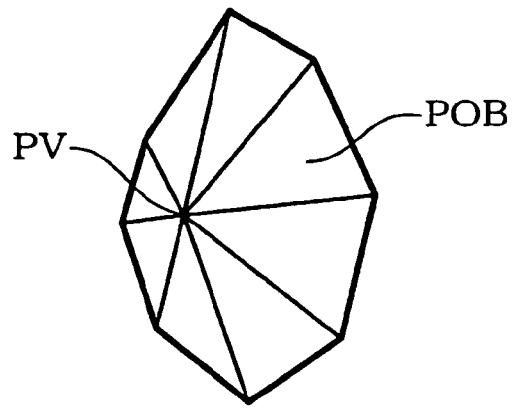
FIGS. 3A, 3B and 3C show examples of part objects.

In this embodiment, thus, such a problem is overcome by representing a branch of a tree (or model object) by use of such an umbrella-shaped part object POB as shown in FIG. 3A. That is to say, a branch object is represented by use of a part object POB of projection shape that has a projecting portion PV formed on the side of the display surface on which an image is to be drawn (or a texture is to be mapped). More particularly, the branch is represented by a centrally raised conical or pyramid-shaped part object POB (but the bottom of the cone or pyramid being removed). Such a POB is formed by a plurality of primitive faces (triangular polygons) sharing a vertex (or projecting portion PV).

Figure 4A:
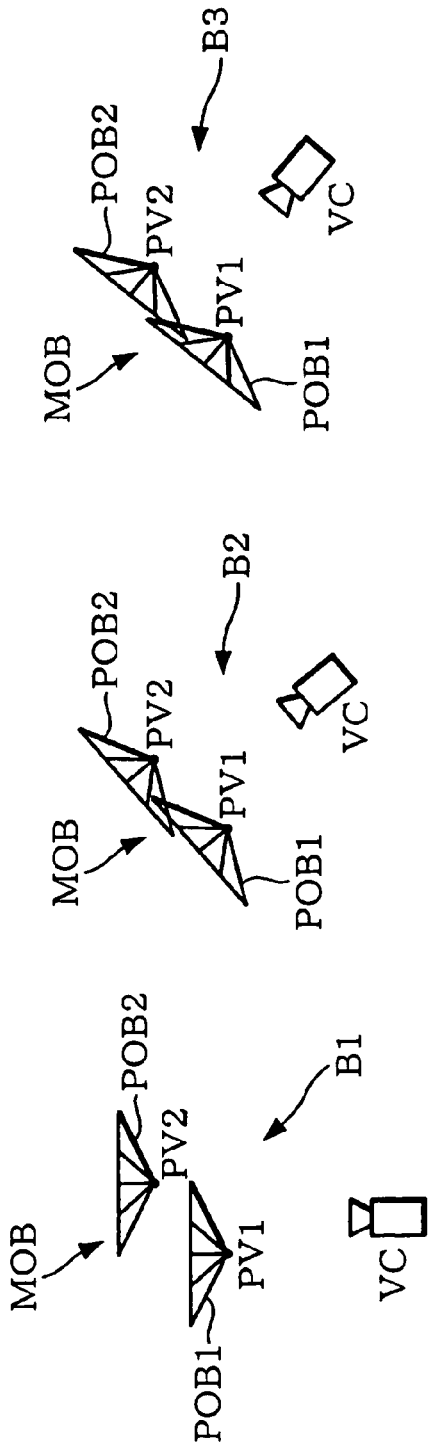
FIGS. 4A and 4B illustrate a technique using projection-shaped part objects in accordance with an embodiment of the present invention.

As shown by B1, B2 and B3 of FIG. 4A, the part objects (branches) POB1 and POB2 forming a model object (tree) MOB are rotated so that the display surfaces on which images are to be drawn (or the side of projecting portions PV1 and PV2) are always directed toward the virtual camera VC or so that an imaginary bottom face of each cone or pyramid is directed directly to the face of the virtual camera VC.

Figure 4B:
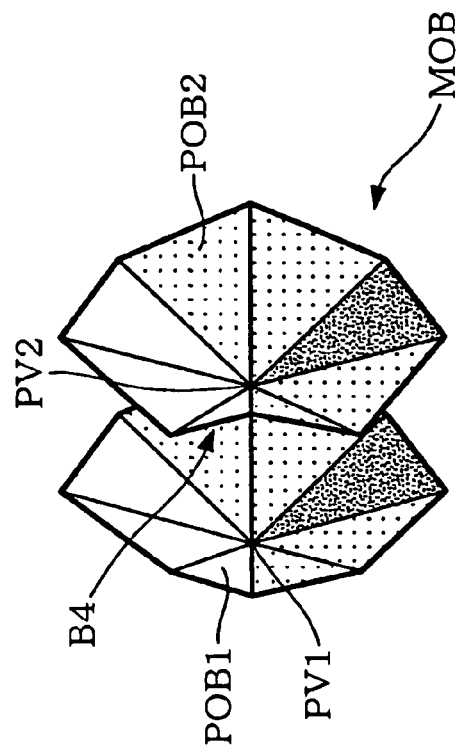

Thus, as shown by B4 in FIG. 4B, the hidden surface removal in the Z-buffer method can effectively be utilized so that the positional relationship between the adjacent part objects POB1 and POB2 will smoothly be inverted, since they merge into each other even though they overlap.

That is to say, at A3 and A4 in FIG. 2B, the positional relationship between PL1 and PL 2 is instantaneously inverted. However, in FIG. 4B, the positional relationship between POB1 and POB2 is gradually inverted while gradually changing the shape of an intersection boundary line shown at B4. Thus, the player will not notice that the tree branch is represented by simple part objects POB1 and POB2. As a result, a high-quality image can be generated with smaller amount of data.

For example, as a technique different from that of this embodiment, it is also conceivable to take a technique of fixedly arranging such a part object POB as shown in FIG. 3A in all directions without depending on the position of the virtual camera VC. In such a technique, however, the number of polygons in the model object representing the tree will increase since it is necessary to arrange a plurality of part objects POB having such a shape as shown in FIG. 3A around the tree trunk in all directions.

On the contrary, according to the technique of this embodiment, it will not be required that the branch part objects are arranged around the tree trunk in all directions since the branch part object is rotated so that the display surface thereof is directed toward the virtual camera VC as shown in FIG. 4A. Thus, a high-quality image which could not be realized by such a technique as described in connection with FIGS. 2A and 2B can be generated while minimizing the number of polygons (primitive faces) in the model object.

Figure 3B:
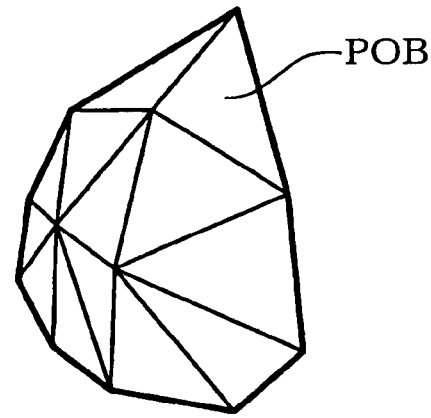
Figure 3C:
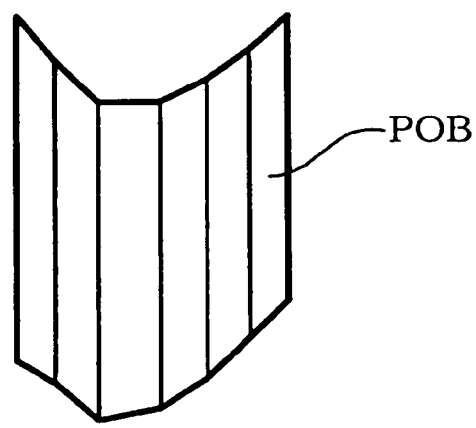

The shape of the part object POB is not limited to such a shape as shown in FIG. 3A. For example, the shape of the part object POB may be of cone shape rather than such a pyramid shape as shown in FIG. 3A. Moreover, the shape of the part object POB may have a plurality of projecting portions or vertexes as shown in FIG. 3B. Alternatively, the shape of the part object POB may be of mountain-like angled shape having ridgelines as projecting portions as shown in FIG. 3C.

2.2. Rotation

Next, the concrete rotation of part object will be described. In this embodiment, as shown in FIG. 5A, the model object MOB representing a tree comprises a part object POB representing a branch and a column-shaped or substantially column-shaped part object COB representing a trunk.

The column-shaped part object COB is disposed in the object space to stand along the vertical Y-axis. The part object POB is also arranged at a position spaced apart from the central axis CA of the column-shaped part object COB. More particularly, the part object POB is disposed at a position spaced apart from the central axis CA and also in which it will not overlap the part object COB.

Figure 5A:
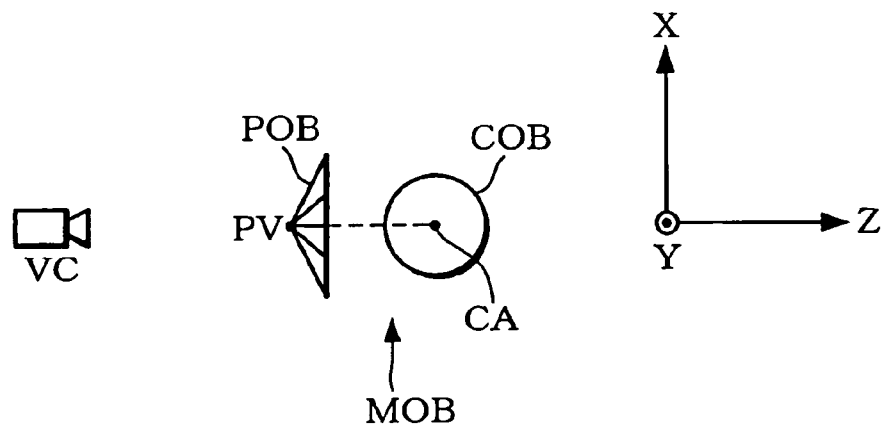
FIGS. 5A and 5B illustrate rotational processing about the Y-axis.
Figure 5B:
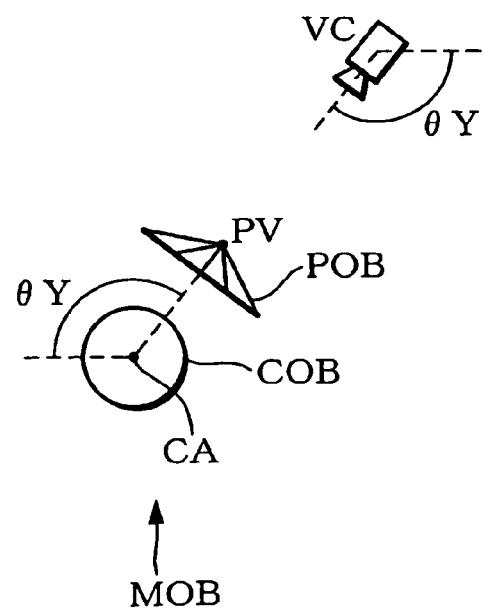

As shown in FIGS. 5A and 5B, the object space setting section 110 rotates the part object POB about the Y-axis so that the display surface (or projecting portion PV) thereof will be directed toward the virtual camera VC as the virtual camera VC rotates about the Y-axis (or panned about the central axis CA) while being directed toward the column-shaped part object COB (POB). That is to say, the part object POB is rotated about the central axis CA following the rotation of the virtual camera VC. For example, if the virtual camera VC rotates about the Y-axis by a rotation angle θY, the part object POB is also rotated about the Y-axis by the rotation angle θY. On the other hand, the column-shaped part object COB representing the trunk will not be rotated.

Figure 6A:
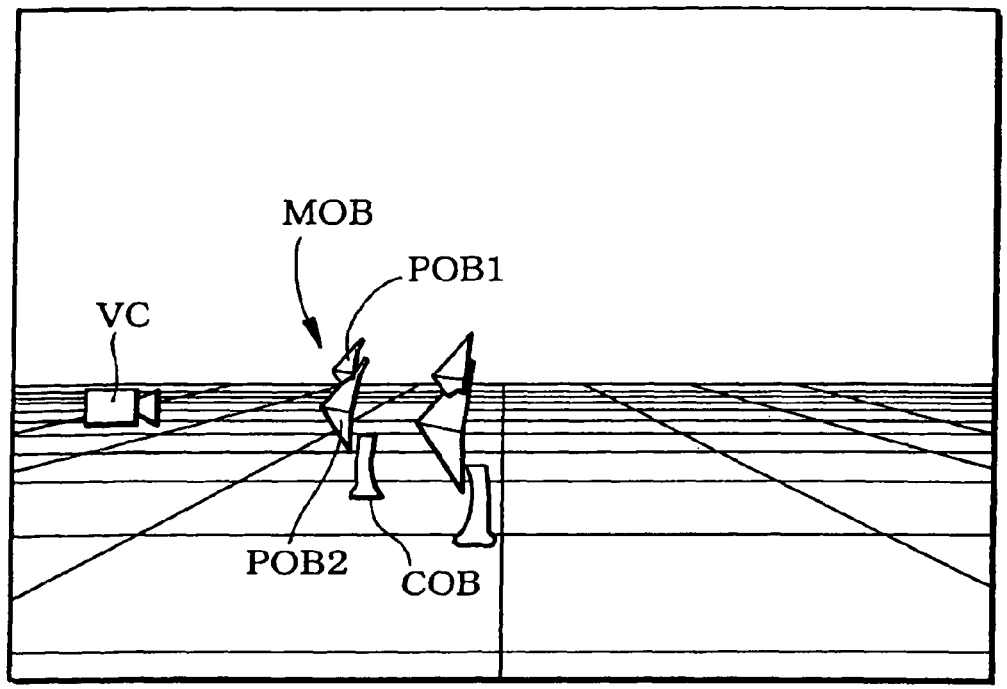
FIGS. 6A and 6B show examples of images generated when a virtual camera rotates about the Y-axis.
Figure 6B:
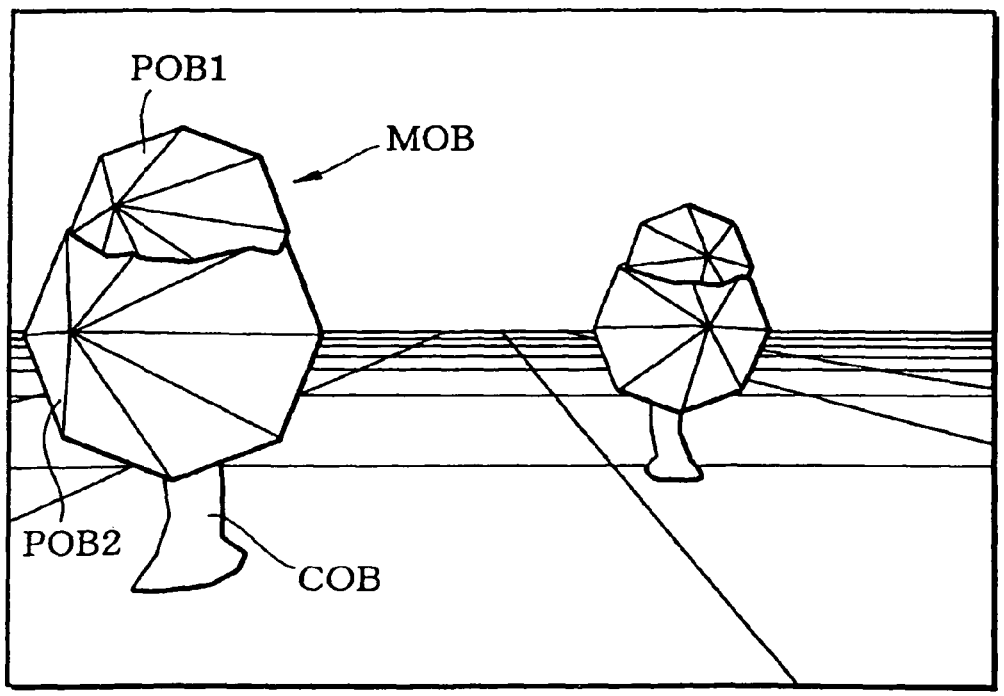
Figure 7A:
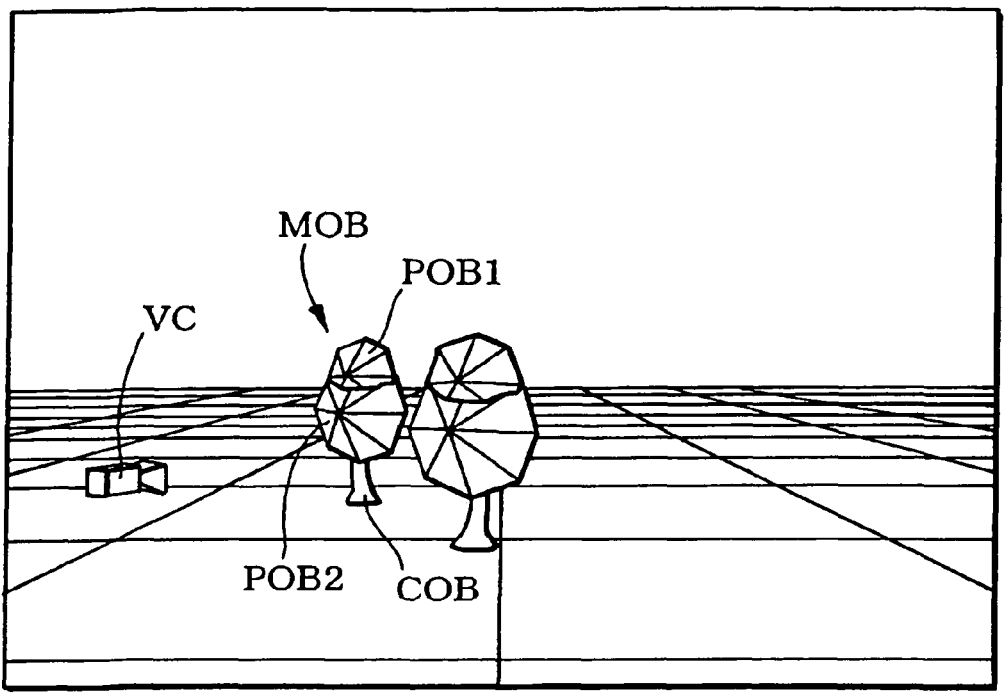
FIGS. 7A and 7B show examples of images generated when the virtual camera rotates about the Y-axis.
Figure 7B:
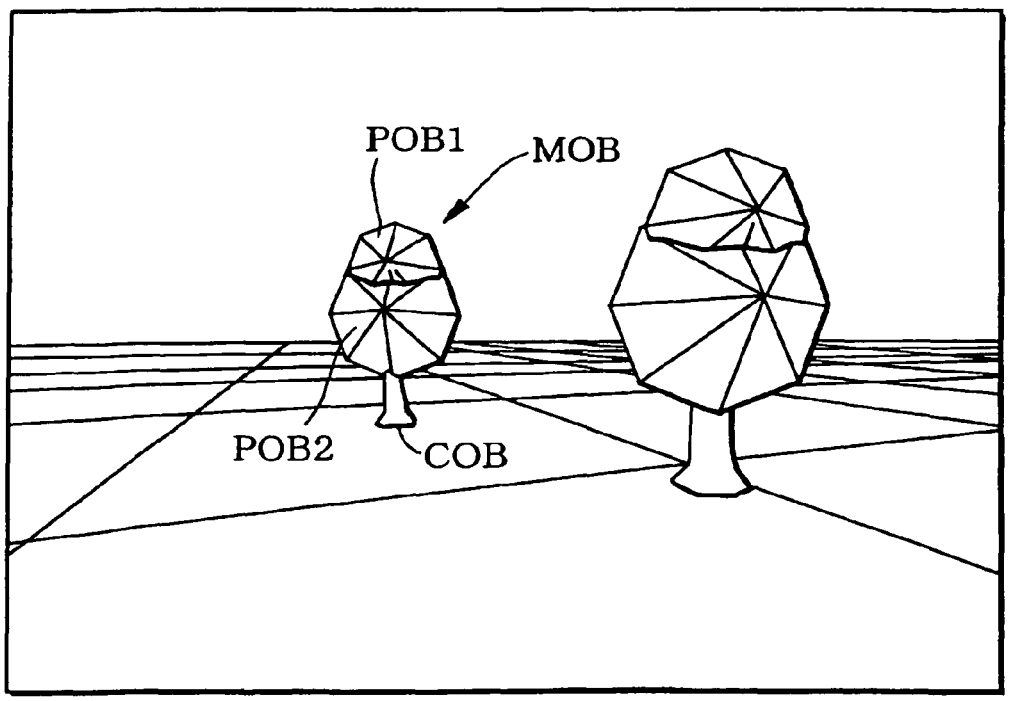

For example, if the positional relationship between the model object MOB formed by the part objects POB1, POB2 and COB and the virtual camera VC is as shown in FIG. 6A, such an image (view image) as shown in FIG. 6B will be generated. And, if the virtual camera VC rotates from the position of FIG. 6A about the Y-axis or panned while being directed toward the model object MOB, as shown in FIG. 7A, such an image as shown in FIG. 7B will be generated.

That is to say, according to this embodiment, it can provide an improved three-dimensional picture in which the part objects POB1 and POB2 can be viewed as if each is a three-dimensional object without opening since the display surfaces (or projecting portions) of the part objects POB1 and POB2 are always directed toward the virtual camera VC. Moreover, even if the virtual camera VC rotates 360 degrees around MOB while being directed toward MOB (or even if the VC rotates 360 degrees about a given coordinate axis), the part objects POB1 and POB2 are located just before the column-shaped part object COB representing the trunk to hide the COB. Therefore, only two part objects POB1, POB2 can be used to provide a picture in which the branches (POB 1, POB 2) can be viewed as if they extend around the trunk (COB) in all directions. As a result, a more realistic and natural image can be generated by use of less primitive faces.

Figure 8A:
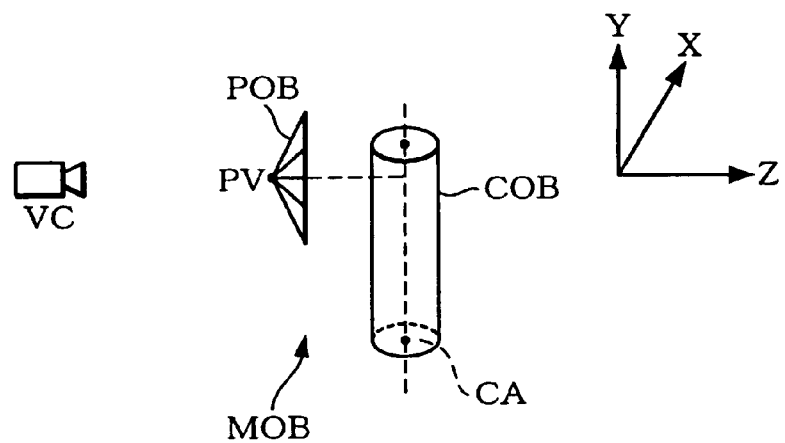
FIGS. 8A and 8B illustrate rotational processing about the X-axis.
Figure 8B:
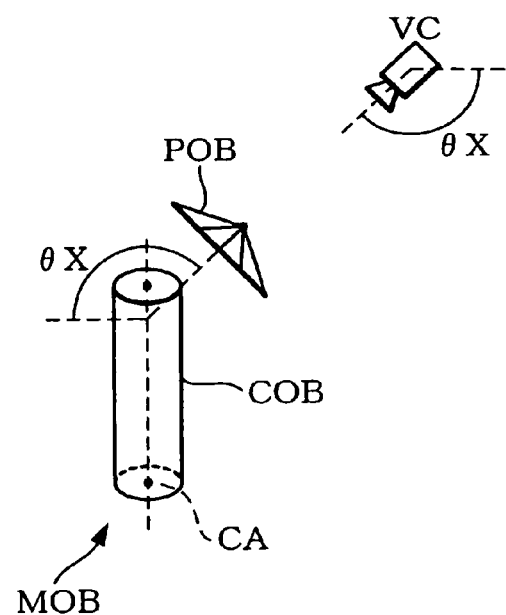

As shown in FIGS. 8A and 8B, the part object POB is rotated about the X-axis so that the display surface (or projecting portion PV) will be directed toward the virtual camera VC as the virtual camera VC rotates about the X-axis (which is perpendicular to the Y-axis) while being directed toward the column-shaped part object COB (POB). That is to say, if the virtual camera VC rotates about the X-axis by a rotation angle θX, the part object POB is also rotated about the X-axis by the rotation angle θX.

Figure 9A:
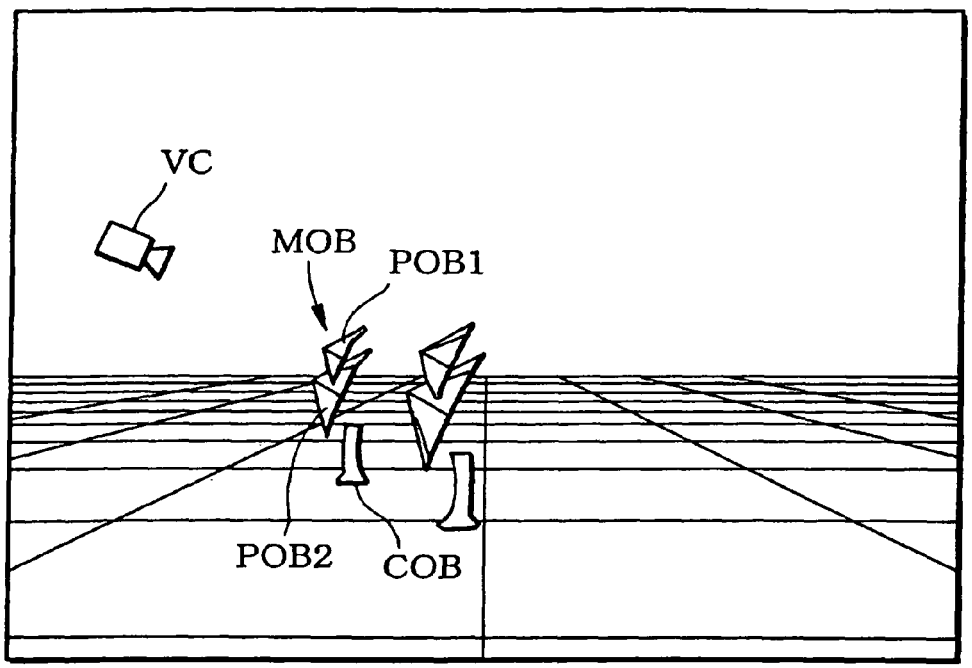
FIGS. 9A and 9B show examples of images generated when the virtual camera rotates about the X-axis.
Figure 9B:
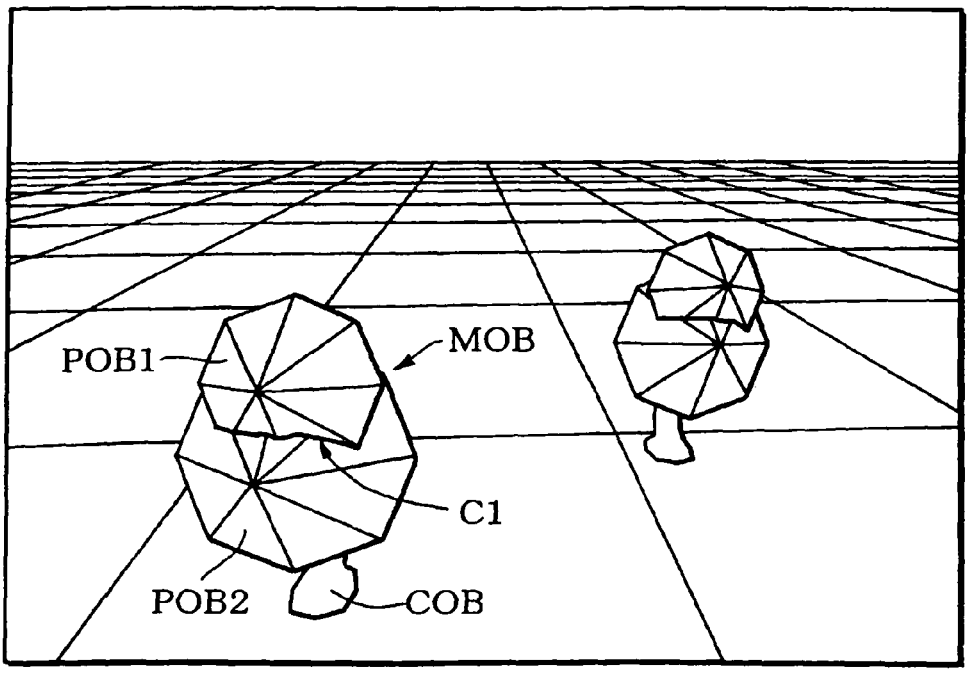
Figure 10A:
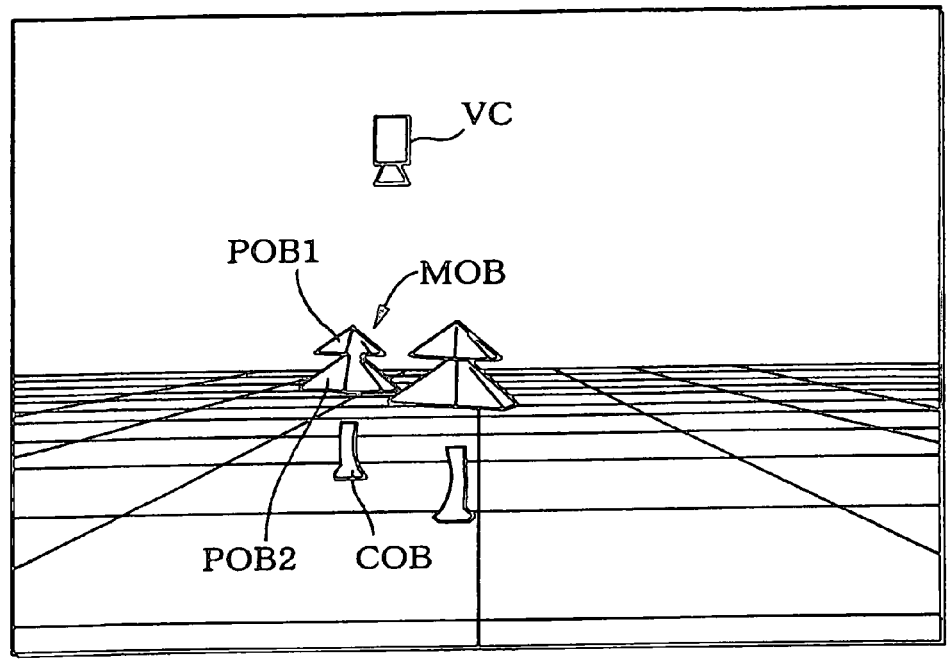
FIGS. 10A and 10B show examples of other images generated when the virtual camera rotates about the X-axis.

For example, if the virtual camera VC rotates about the X-axis to change the relationship between the VC and the model object MOB shown in FIG. 6A to such a positional relationship as shown in FIG. 9A (or a positional relationship in which the virtual camera VC looks down at MOB with a predetermined angle of elevation), such an image as shown in FIG. 9B will be generated. Moreover, if the virtual camera VC is further rotated about the X-axis to change the relationship between the VC and the model object MOB to such a positional relationship as shown in FIG. 10A (or a positional relationship in which the virtual camera VC looks down at MOB from just above), such an image as shown in FIG. 10B will be generated.

In such a manner, according to this embodiment, even if the virtual camera VC is not only rotated about the Y-axis but also about the X-axis (that is, even when the virtual camera VC looks down at the model object MOB from above), the display surfaces of the part objects POB1 and POB2 will always be directed toward the virtual camera VC. And, the object parts POB1 and POB2 will hide the column-shaped part object COB representing the trunk. Therefore, this embodiment can represent the branches as if they are three dimensional objects without opening and also generate a realistic image in which the branches can be viewed as if they extend around the trunk in all directions. Moreover, for example, in an airplane game wherein a moving object (airplane or the like) flies over a tree looking down at the ground, a more natural and consistent image can be generated.

Figure 10B:
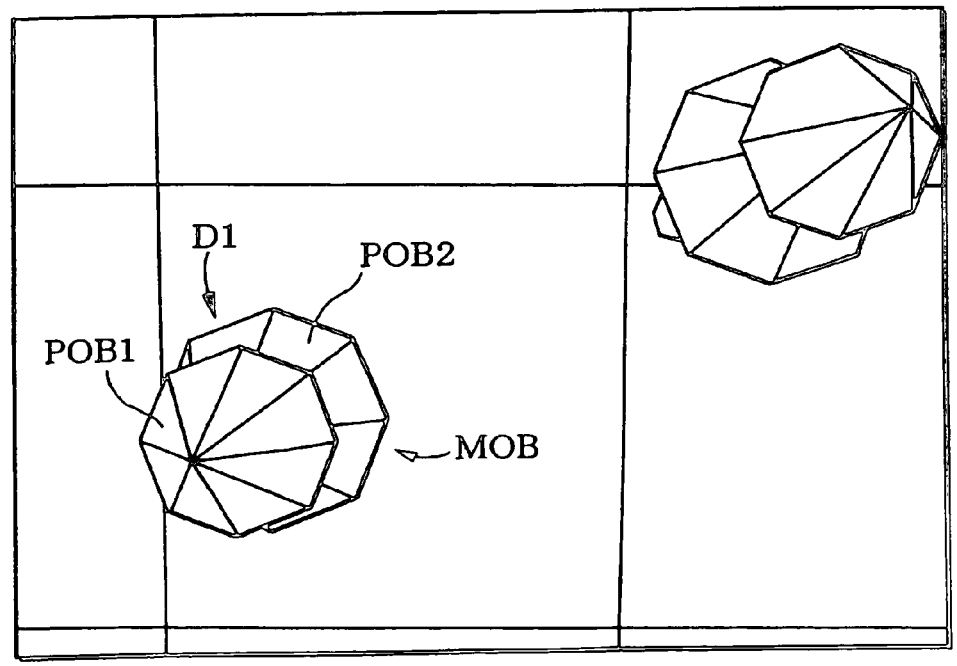
Figure 11A:
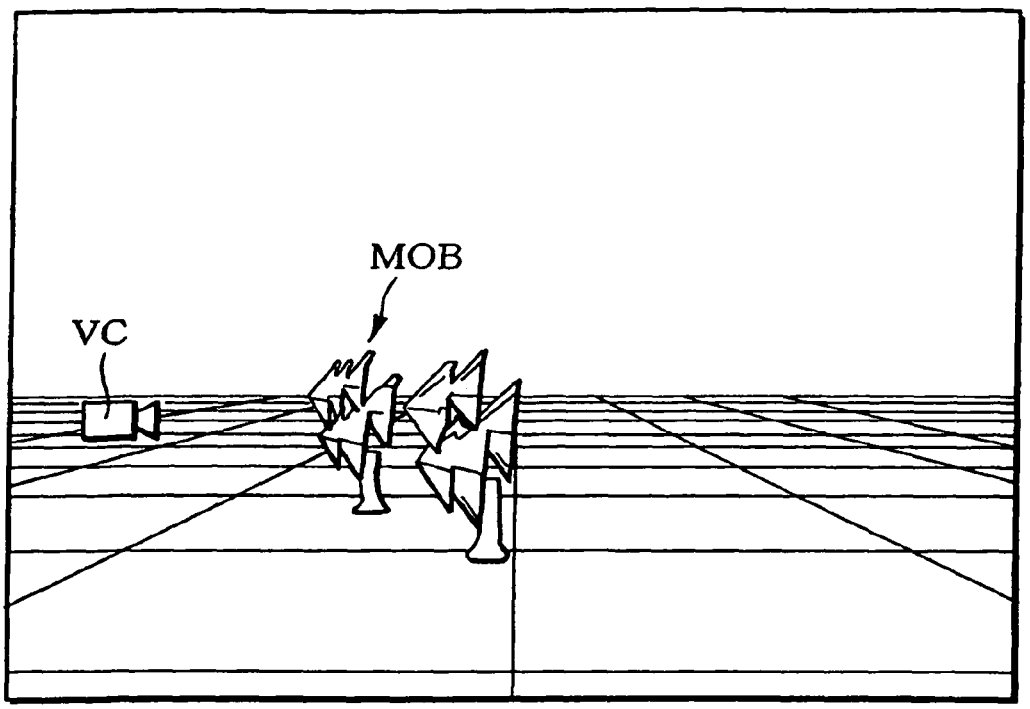
FIGS. 11A and 11B show examples of images of model objects each configured by a number of part objects.
Figure 11B:
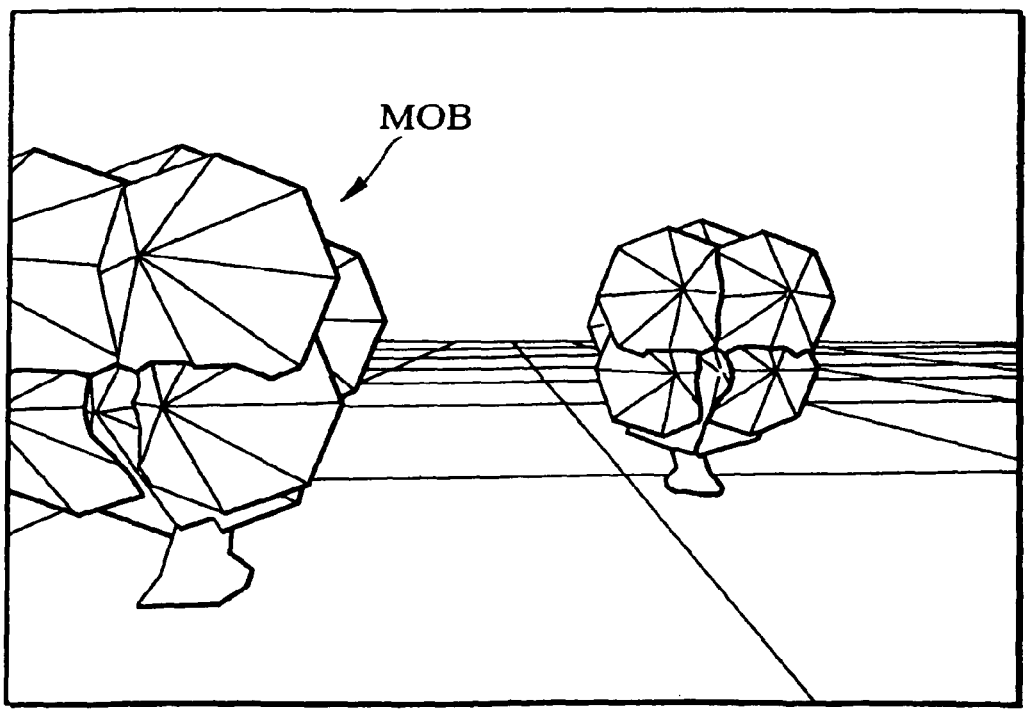
Figure 12A:
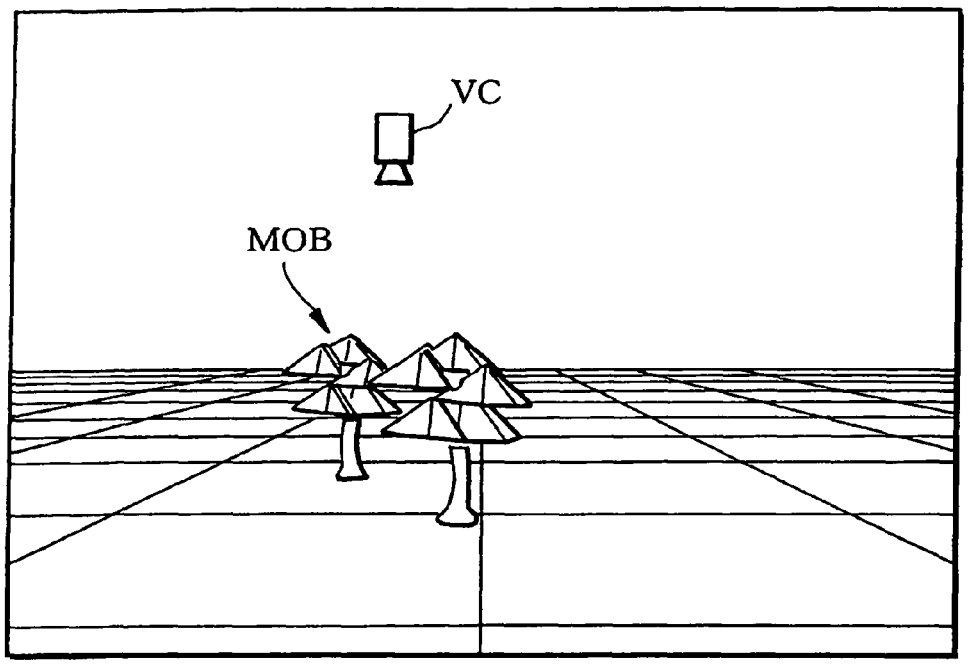
FIGS. 12A and 12B show examples of images of model objects each configured by a number of part objects.
Figure 12B:
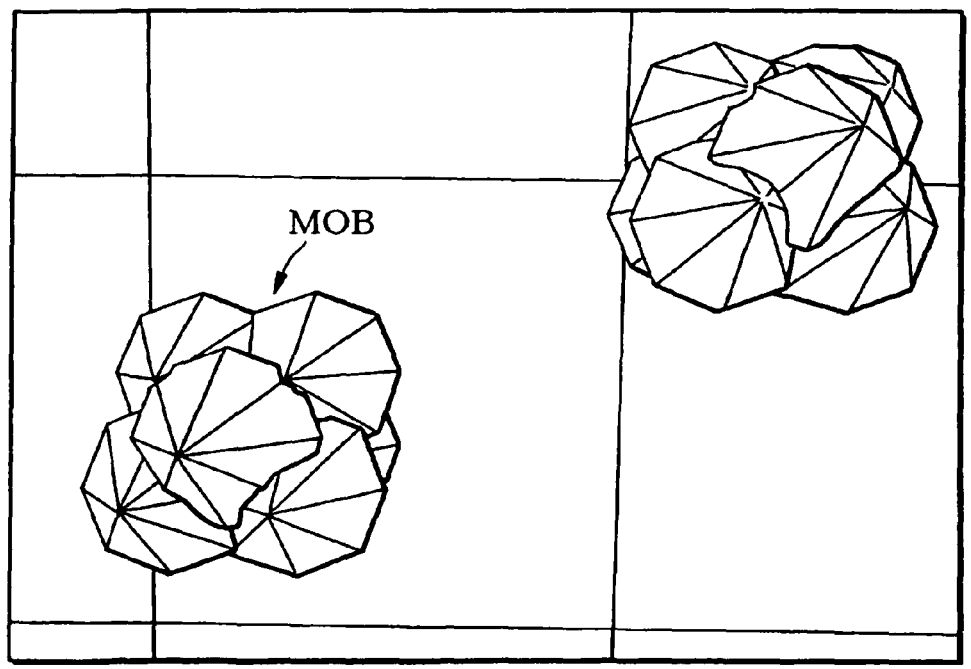

Furthermore, according to this embodiment, the positional relationship between the part objects POB1 and POB2 (or the positional relationship therebetween in the direction of depth in the camera coordinate system) can smoothly be inverted by effectively using the hidden surface removal function of the Z-buffer method, as shown by C1 in FIG. 9B and by D1 in FIG. 10B. Therefore, an image in which a player does not feel unnaturalness can be generated.

The number of part objects representing branches is not limited to two, but may be increased to three or more. Alternatively, only a single part object may be used. For example, FIGS. 11A, 11B, 12A and 12B illustrate model objects MOB each of which comprises a number (e.g., ten) of part objects. When the number of part objects increases in such a manner, the number of primitive faces also increases. However, it may generate an improved three-dimensional image of tree.

Figure 13:
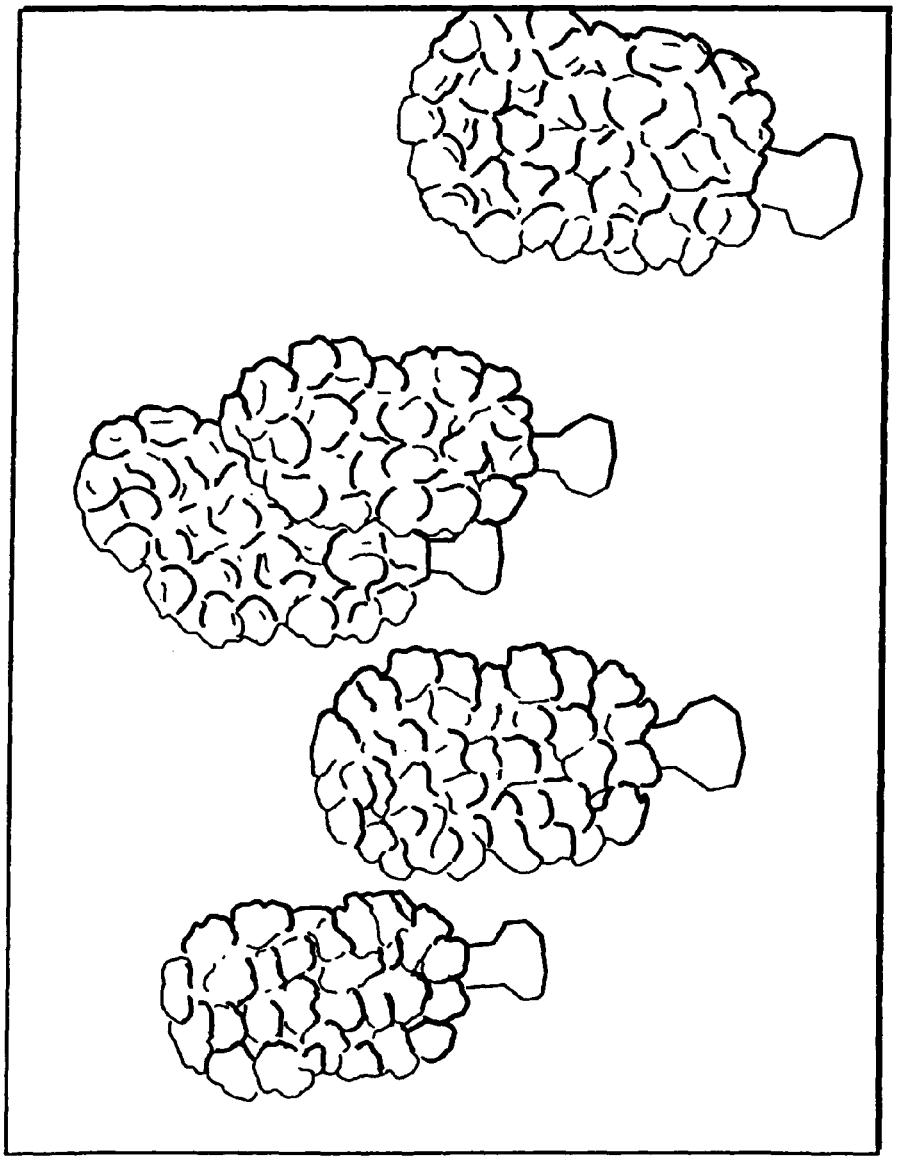
FIG. 13 shows a texture-mapped image.

FIG. 13 illustrates a final image which is obtained by mapping a tree texture on part objects. In this case, it is desirable that the mapped texture is one that can set an alpha-value (transparency or translucency) on each of the texels.

2.3. Spacing Between Arranged Part Objects

It is desirable that the spacing between adjacent part objects (branches) forming a model object (tree) is set as follows. For example, FIG. 14 shows adjacent part objects POB1, POB2 (first and second part objects) included in a model object MOB.

Even if the virtual camera VC rotates 360 degrees about a given coordinate axis (Y-axis, X-axis or the like), as shown at E1 to E8 in FIG. 14, the part objects POB1, POB2 intersect each other or the part objects POB1, POB2 are arranged with such a spacing that they overlap each other in a view image viewed from the virtual camera VC. Such a spacing may be realized, for example, by arranging the part objects POB1, POB2 so that, if it is assumed that the length of a generating line extending from one projecting portion (vertex) PV1 in the part object POB1 to the peripheral edge of the same (see E1 in FIG. 14), the projecting portion PV2 of the object part POB2 is positioned within a circle having a radius L (or twice L) measured from the projecting portion PV1.

For example, at E2 and E6 in FIG. 14, the adjacent part objects POB1, POB2 intersect each other. That is to say, there is created such an intersection boarder line as shown at C1 in FIG. 9B. On the other hand, at E1, E3, E4, E5, E7 and E8 in FIG. 14, the part objects POB1, POB2 overlap each other in the view image viewed from the virtual camera VC. That is to say, as shown at D1 in FIG. 10B, the part objects POB1, POB2 are arranged so that the part object POB1 is located forward of the other part object POB2 in the depth direction. And, the part objects POB1, POB2 overlap each other in the view image of the virtual camera VC shown in FIG. 10B.

If the part objects POB1, POB2 are arranged in such a manner, there will not be created a clearance between the part objects POB1, POB2 as viewed by the virtual camera VC. Therefore, the column-shaped part object COB representing the trunk of the tree can be hidden by the part objects POB1, POB2. Thus, a more natural and realistic image can be generated.

Although the two part objects (branches) are shown in FIG. 14, three or more part objects may be used under the same concept.

2.4. Z Texture

In this embodiment, the virtual shape of a part object POB may be represented by mapping a Z texture in which an offset Z-value (changed Z-value or corrected Z-value) is set to each texel onto the part object POB.

Figure 15A:
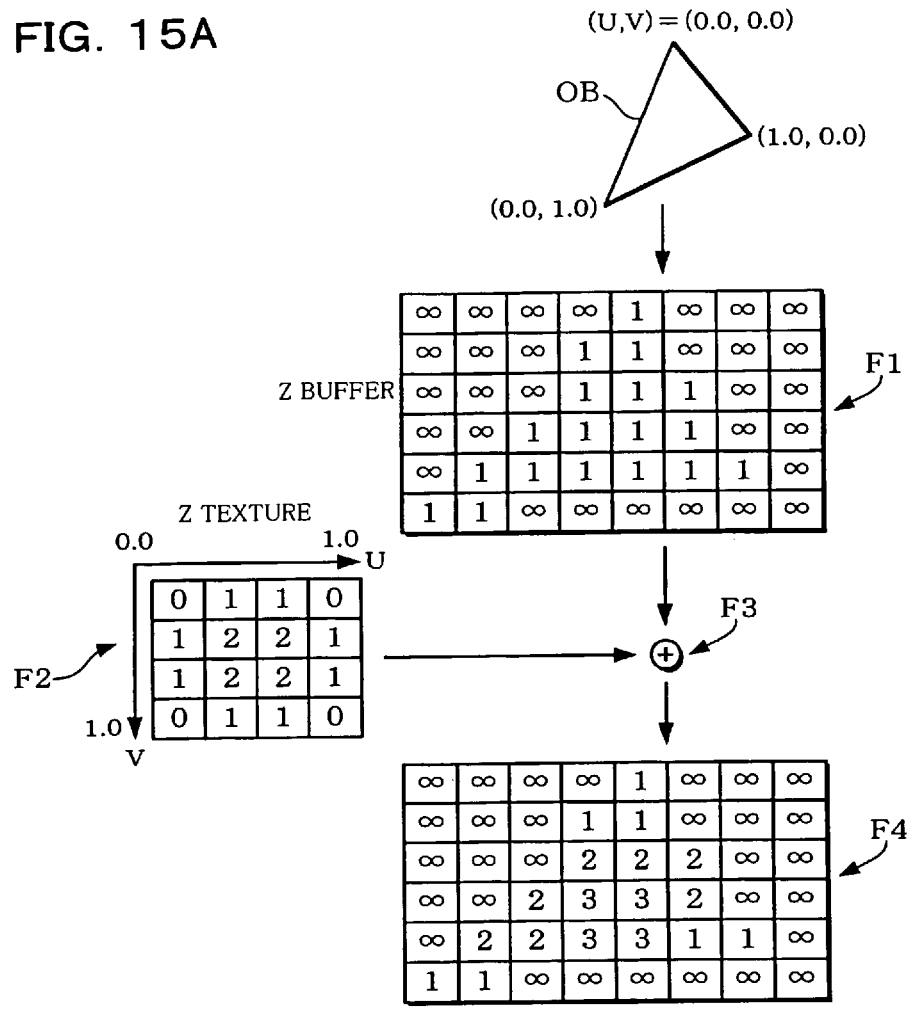
FIGS. 15A, 15B and 15C illustrate a Z-texture-mapping.
Figure 15B:
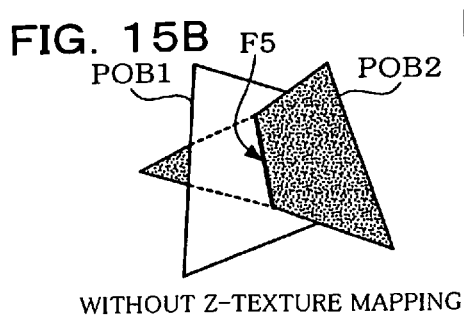

FIG. 15A illustrates the principle of Z-texture-mapping technique. In FIG. 15A, an object OB (which is, in a narrow sense, a polygon: The same shall apply hereinafter) has vertexes, on each of which texture coordinates (U, V) used to read the Z texture are set.

According to the conventional texture mapping, a colored "pattern" stored in the texture storage section 178 of FIG. 1 will be applied to the object OB when it is to be drawn. On the contrary, the Z-texture-mapping causes offset Z-values to be subjected to addition (or subtraction) so that a "pattern" of Z-value is applied to the region of the Z buffer 176 corresponding to the object OB.

For example, at F1 in FIG. 15A, a Z-value corresponding to the object OB (which is shown by "1" in FIG. 15A) is written into the Z buffer 176 by drawing the object OB into drawing buffer 174.

On the other hand, as shown at F2 in FIG. 15A, an offset Z-value is set on each of the texels in the texture storage section 178 (Z-texture space). The offset Z-value is then read out of the texture storage section 178, based on the texture coordinate (U, V) set on each vertex in the object OB.

The offset Z-value read out at F2 is then added to or subtracted from the Z-value (or original Z-value in the object OB) in the Z buffer 176 shown at F1, as shown at F3. Thus, as shown at F4, a new Z-value (Z-plane) will be generated by adding or subtracting the offset Z-value to or from the original Z-value in the object OB. The hidden surface removal process (positional-relationship judgment process based the Z-value) is then carried out on the object OB (polygon), based on the new Z-value obtained by the addition or subtraction of the offset Z-value at F4.

Figure 15C:
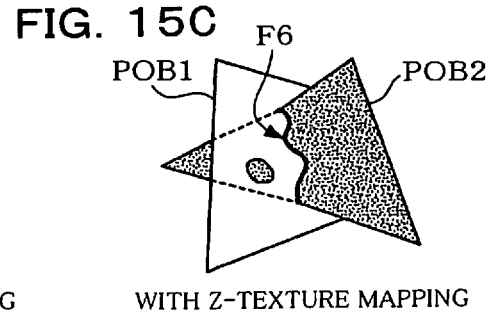

For example, if the Z-texture-mapping is not used, the intersection boundary line between the part objects POB1, POB2 becomes a straight line as shown at F5. On the contrary, if the Z-texture-mapping is used, the intersection boundary line between POB1 and POB2 can delicately be waved as shown at F6 in FIG. 15C. In this embodiment, this Z-texture-mapping technique is used to represent the fine bump shapes of the part object or to represent the entire projection shape of the part object itself.

Figure 16A:
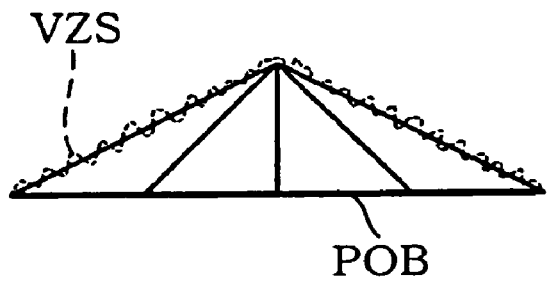
FIGS. 16A, 16B and 16C illustrate a technique of using the Z-texture mapping to represent the whole projection shape or fine bump shapes.

For example, FIG. 16A shows a projection-shape-object having a projecting portion formed on the display surface in which an image is to be drawn, this object being used as a part object POB. The Z texture for setting the bump shapes on the display surface of POB by pixel is then mapped on this projection-shaped part object POB. Thus, virtual bump shapes VZS are set on the part object POB. That is to say, virtual Z-values for providing bump shapes in the direction of sight line by pixel are set in that region of the Z buffer 176 corresponding to the part object POB.

The hidden surface removal process on the part object POB (or the hidden surface removal process between the part object POB and the other part object) is then carried out, based on this virtual Z-value (shape VZS). Therefore, the intersection boundary line between POB1, POB2 can more delicately be waved as shown at C1 in FIG. 9B. As a result, even if the position or rotation angle of the virtual camera VC is changed, the positional relationship between POB1, POB2 can delicately be inverted by pixel. Consequently, a more natural and realistic image can be generated.

Figure 16B:
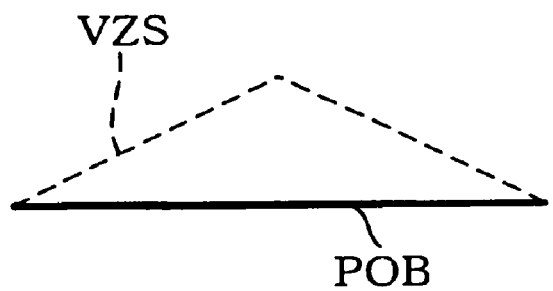

In addition, a flat plate-shaped object (polygon) may be used as a part object POB, and a Z texture used for forming a virtual projection shape VZS (which is similar to the projection shape in POB shown in FIG. 16A) on the display surface of the POB may be mapped on the POB, as shown in FIG. 16B. Thus, a simply shaped part can be used as the part object POB, resulting in further decrease of the number of primitive faces.

Figure 16C:
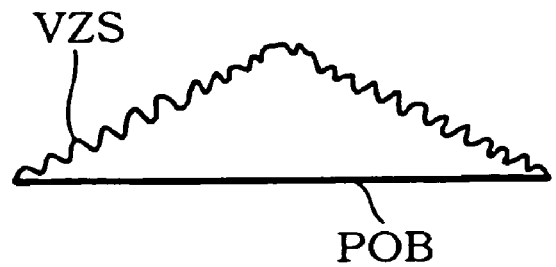

Moreover, a Z texture used to set fine bump shapes by pixel in addition to a relatively large projection shape may be mapped on the flat plate-shaped part object POB, as shown in FIG. 16C. Thus, a more realistic image can be generated with less primitive faces.

The technique of FIG. 16A uses more primitive faces than those of the techniques shown in FIGS. 16B and 16C. In the shading process using a light source, however, a realistically shaded image can be generated since the projection shape of the part object POB can be reflected. If a normal-line texture in which the normal-line information is set on each texel is used, however, the techniques of FIGS. 16B and 16C can also perform the realistic representation for shading.

3. Processing of this Embodiment

The details of a process according to this embodiment will be described in connection with a flow chart of FIG. 17.

First of all, the position (CX, CY, CZ) of the virtual camera VC and the rotation angles ($\theta X$, $\theta Y$, $\theta Z$) thereof about the respective coordinate axes are set (step S1). For example, if the virtual camera VC follows a moving object such as airplane or motorcar, the position and rotation angle of the virtual camera VC can be set based on the position and rotation angle of the moving object. Moreover, if the virtual camera VC moves over a predetermined orbit, the position and rotation angle of the virtual camera can be set based on the virtual camera data.

Next, a variable i is set to 1 (step S2). Object data for the i-th branch part object POBi are then read out, and the rotation angle of the POBi is transformed into the world coordinate system so that the POBi is directed toward the virtual camera VC, based on the rotation angles ($\theta X$, $\theta Y$, $\theta Z$) of the VC (step S3). Thus, such a rotation of the part object as shown in FIGS. 5A, 5B, 8A and 8B can be realized. FIG. 18 shows an example of object data. This object data comprise positions Xi, Yi and Zi of each branch part object POBi, rotation angles $\theta Xi$, $\theta Yi$, $\theta Zi$ thereof and object numbers thereof in the local coordinate system.

The position of the branch part object POBi (or position included in the object data) is then transformed into the world coordinate system (step S4). The camera coordinate (viewpoint coordinate) transformation and perspective transformation are then carried out on the branch part object POBi. The branch part object POBi is then drawn in the drawing buffer while performing the hidden surface removal with the use of the Z buffer (step S5). The variable i is incremented by "1" (step S6).

Next, it is judged whether or not the variable i is larger than N (the number of branch part objects) (step S7). If i≦N, the procedure returns to the step S3. On the other hand, if i>N, the world coordinate transformation, camera coordinate transformation and perspective transformation are carried out on the trunk (column-shaped) part object COB. The trunk part object COB is then drawn in the drawing buffer while performing the hidden surface removal with the use of the Z buffer (step S8). Thus, such view images as shown in FIGS. 6B, 7B and the like will be generated.

Although FIG. 17 describes that the trunk part object is drawn after the branch part object has been drawn, the branch part object may be drawn after the trunk part object has been drawn.

4. Hardware Configuration

Figure 19:
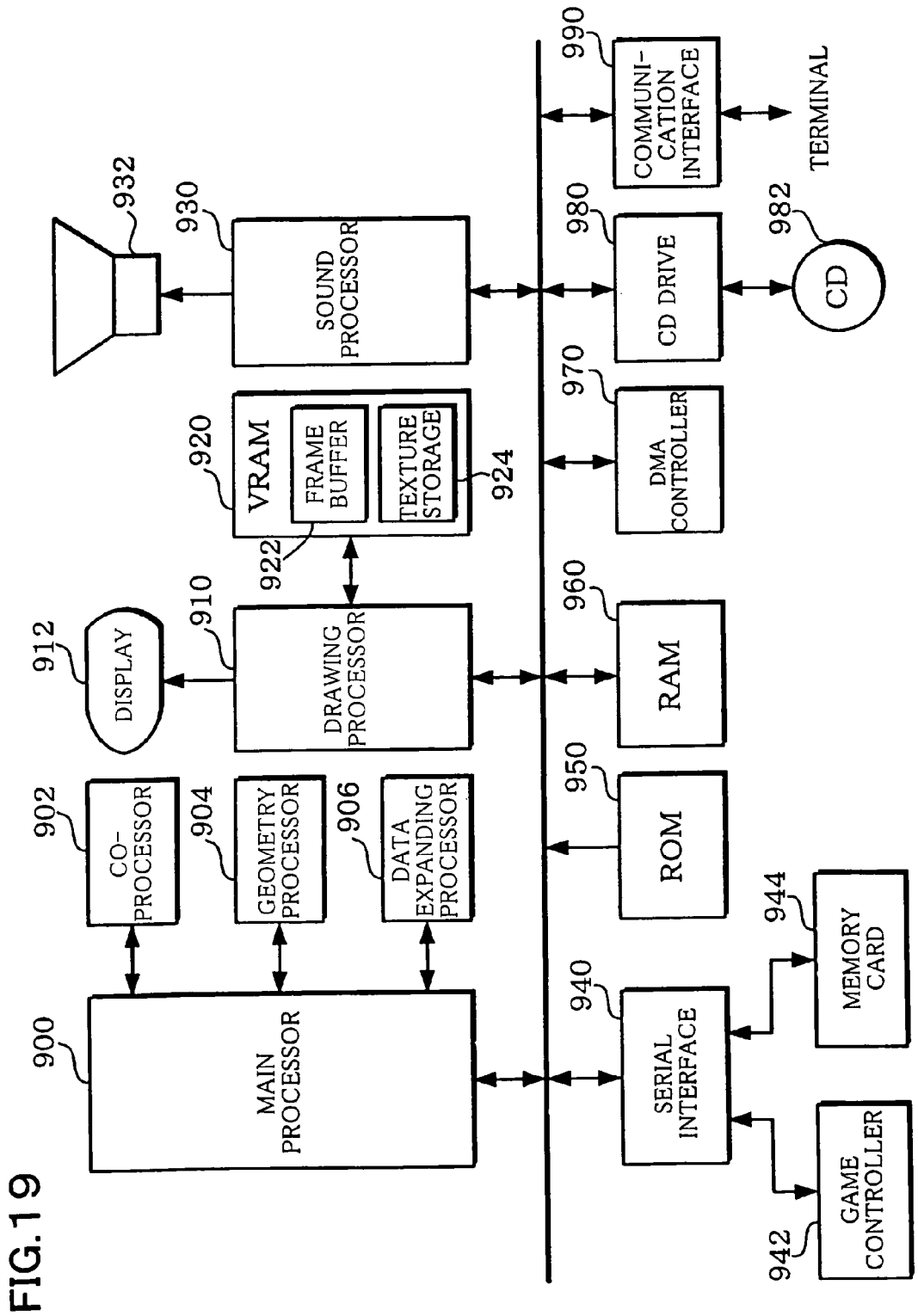
FIG. 19 is an example of a hardware configuration.

FIG. 19 illustrates a hardware configuration by which this embodiment can be realized.

A main processor 900 operates to execute various processing such as game processing, image processing, sound processing and other processing according to a program stored in a CD (information storage medium) 982, a program transferred through a communication interface 990 or a program stored in a ROM 950.

A co-processor 902 is to assist the processing of the main processor 900 and has a sum of product circuit or a divider which can perform high-speed parallel calculation to execute a matrix (or vector) calculation at high speed. For example, if a physical simulation for causing an object to move or act (motion) requires the matrix calculation or the like, the program running on the main processor 900 instructs (or asks) that processing to the co-processor 902.

A geometry processor 904 is to perform geometry processing such as coordinate transformation, perspective transformation, light source calculation, curve formation or the like and has a sum of product circuit or a divider which can perform high-speed parallel calculation to execute a matrix (or vector) calculation at high speed. For example, for the coordinate transformation, perspective transformation and light source calculation, the program running on the main processor 900 instructs that processing to the geometry processor 904.

A data expanding processor 906 is to perform a process for decoding or expanding image and sound compressed data or a process for accelerating the decoding process in the main processor 900. Thus, animation images compressed by MPEG method or the like can be displayed in the opening, intermission, ending or game scene.

A drawing processor 910 is to draw or render an object constructed by primitive faces such as polygons or curved surfaces at high speed. On drawing of an object, the main processor 900 uses the function of a DMA controller 970 to deliver the drawing data to the drawing processor 910 and at the same time, transfers the texture to a texture storage section 924, if necessary. Then, the drawing processor 910 draws the object in a frame buffer 922 while performing the hidden surface removal using the Z buffer and the like, based on the drawing data and texture. The drawing processor 910 can also perform a-blending (or translucency processing), depth cueing, mip-mapping, fog processing, bi-linear filtering, tri-linear filtering, anti-aliasing, shading and the like. As the image for one frame has been written into the frame buffer 922, that image is then displayed on a display 912.

A sound processor 930 includes a multi-channel ADPCM sound source and the like and generates and outputs game sounds such as BGMs, sound effects, voices through a speaker 932. Operation data from a game controller 942 and save data from a memory card 944 and personal data are inputted through a serial interface 940.

A ROM 950 has stored a system program and the like. In arcade game systems, a ROM 950 functions as an information storage medium for storing various programs. The ROM 950 may be replaced by any hard disk. A RAM 960 serves as working area for various processors. A DMA controller 970 controls DMA transfer between the processors and the memories (RAM, VRAM, ROM and the like). A CD drive 980 works to access a CD 982 in which programs, image data or sound data have been stored.

A communication interface 990 performs data transfer between the present system and an external through a network. The network connected to the communication interface 990 includes a telecommunication line (analog phone line or ISDN) and a high-speed serial bus.

All the sections (means) of this embodiment may be executed only through hardware or only through a program which has been stored in an information storage medium or which is distributed through the communication interface. Alternatively, they may be executed through both the hardware and program.

If the sections of this embodiment are to be realized through both the hardware and program, the information storage medium has stored a program for causing the hardware (or computer) to function as the respective sections in this embodiment. More particularly, the aforementioned program instructs the processing to the processors 902, 904, 906, 910, 930, and the like, all of which are hardware, and delivers the data to them, if necessary. And, each of the processors 902, 904, 906, 910, 930, and the like will realize the processing of the corresponding one of the functional sections of the present invention, based on the instructions and delivered data.

Figure 20A:
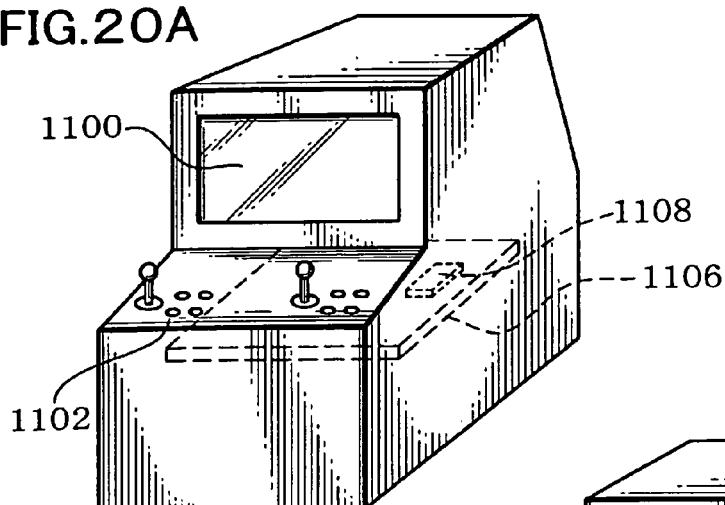
FIGS. 20A, 20B and 20C show examples of systems in various forms.

FIG. 20A illustrates an arcade game system to which this embodiment is applied. Players enjoy a game by operating control sections 1102 while viewing a game scene displayed on a display 1100. Processors, memories and the like are mounted on a system board 1106 built in the game system. The program (data) for realizing all the sections of this embodiment has been stored in a memory 1108 which is an information storage medium on the system board 1106. This program is referred to as stored program.

Figure 20B:
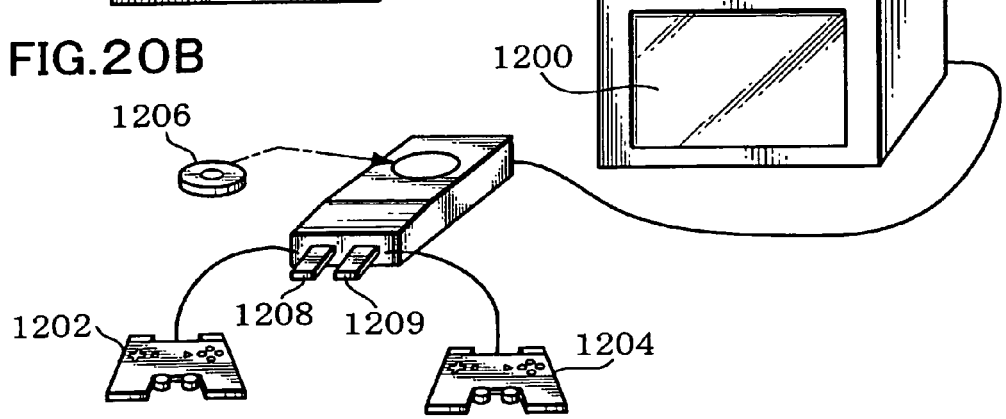

FIG. 20B illustrates a home game system to which this embodiment is applied. In this case, the aforementioned stored program (or stored information) have been stored in a CD1206 which is a removable information storage medium on the main system body or in memory cards 1208, 1209.

Figure 20C:
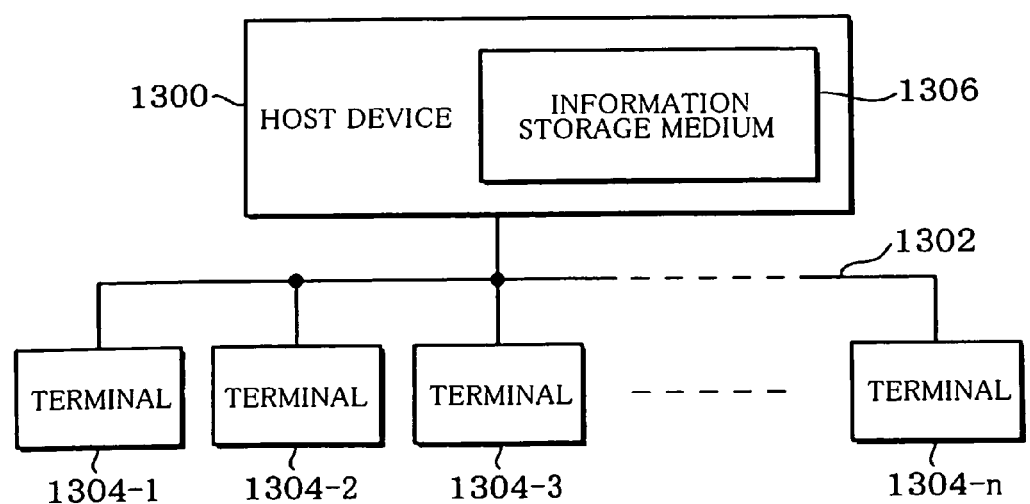

FIG. 20C illustrates a system to which this embodiment is applied, this system including a host device 1300 and terminals 1304-1 to 1304-*n* (gaming machines or cellular phones) which are connected to this host device 1300 through a network 1302. In this case, the aforementioned stored program has been stored in the information storage medium 1306 (hard disk, a magnetic tape device or the like) in the host device 1300. Moreover, the processing for each section of this embodiment may be realized by the host device and terminals in a distributed manner.

However, the present invention is not limited to the aforementioned embodiment, but may be carried out in any one of various other forms.

For example, the terms (e.g., tree, branch, trunk, polygon, primitive face, plant, and the like) referred to in a passage of the specification or drawing as broader or synonymous terms (e.g., model object, part object, column-shaped part object, object, tree and so on) may be replaced by such broader or synonymous terms similarly in another passage of the specification or drawing.

Part of requirements of a claim of the present invention could be omitted from a dependent claim which depends on that claim. Moreover, part of requirements of any independent claim of the present invention could be made to depend on any other independent claim.

Moreover, the rotation of part object is not limited to that described in connection with this embodiment, but may be carried out through any one of various other processes.

The present invention can be applied to various games (such as fighting games, competition games, shooting games, robot fighting games, sports games, role playing games and the like).

Moreover, the present invention can be applied to various image generating systems (or game systems) such as arcade game systems, home game systems, large-scale attraction system in which a number of players play a game, simulators, multimedia terminals, system boards for generating game images and so on.

The specification discloses the following matters about the configuration of the embodiments described above.

According to one embodiment of the present invention, there is provided an image generation method for generating an image comprising:

storing object data in an object data storage section;

disposing a plurality of objects in an object space, based on the object data stored in the object data storage section;

controlling a virtual camera; and generating an image viewed from the virtual camera in the object space while performing hidden surface removal processing, the method further comprising:

disposing in the object space a model object including a plurality of part objects each of which has a projection shape, each of the part objects having a projecting portion formed on a display surface on which an image is drawn; and rotating each of the part objects based on rotational information of the virtual camera so that the display surface of each of the part objects is directed toward the virtual camera.

According to this embodiment, the model object comprises projection-shaped part objects each of which has a projecting portion (a vertex and ridgelines) formed on the side of the display surface (front surface). When the virtual camera rotates, the part objects are rotated while the display surfaces (or projecting portions) thereof are directed toward the virtual camera. Thus, the image of the display surface of the part object will have its maximum area in the view image which is viewed from the virtual camera. Consequently, a realistic image can be generated with less primitive faces. When the virtual camera rotates (or when the orientation of the virtual camera is changed), furthermore, the positional relationship between the adjacent part objects (in the depth direction) will gradually be inverted. As a result, a more natural image can be generated.

The image generation method may further comprise:

storing a Z texture in which an offset value of a Z-value is set on each texel in a texture storage section; and mapping the Z texture stored in the texture storage section on each of the objects, and the method may further comprise:

mapping on each of the part objects the Z texture for setting bump shapes on the display surface by pixel unit.

In such a manner, the bump shapes (virtual Z-values) finer than the projecting portions inherent in the part objects can be virtually set on the display surfaces of the part objects, resulting in representation of a delicately waved intersection boundary line.

According to another embodiment of the present invention, there is provided an image generation method for generating an image comprising:

storing object data in an object data storage section;

disposing a plurality of objects in an object space, based on the object data stored in the object data storage section;

storing a Z texture in which an offset value of a Z-value is set on each texel in a texture storage section;

mapping the Z texture stored in the texture storage section on each of the objects;

controlling a virtual camera; and generating an image viewed from the virtual camera in the object space while performing hidden surface removal processing, the method further comprising:

disposing a model object having a plurality of part objects in the object space;

rotating each of the part objects based on rotational information of the virtual camera so that a display surface of each of the part objects on which an image is drawn is directed toward the virtual camera; and mapping on each of the part objects the Z texture for forming a virtual projection shape on the display surface of the part objects.

According to this embodiment, a part object is rotated so that the display surface thereof is directed toward the virtual camera, and at the same time a Z texture for setting a virtual projection shape (virtual Z-value) on the display surface of the part object is mapped on the part object. Thus, the image of the display surface of the part object will have its maximum area in the view image which is viewed from the virtual camera. Consequently, a realistic image can be generated with less number of primitive faces. Moreover, the positional relationship between the adjacent part objects (in the depth direction) will gradually be inverted using the virtual Z-values set by the Z texture. As a result, a more natural image can be generated.

The image generation method may further comprise:

disposing a column-shaped part object included in the model object so as to stand along a Y-axis, the Y-axis being an axis along a vertical direction;

disposing each of the part objects at a position apart from a central axis of the column-shaped part object; and rotating each of the part objects about the Y-axis so that the display surface of each of the part objects is directed toward the virtual camera when the virtual camera rotates about the Y-axis while being directed toward the column-shaped part object.

Thus, even if the virtual camera is panned about the Y-axis while being directed toward the model object, an image viewed as if the part objects exist over the column-shaped part object in all directions can be generated.

The image generation method may further comprise:

disposing a column-shaped part object included in the model object so as to stand along a Y-axis, the Y-axis being an axis along a vertical direction;

disposing each of the part objects at a position apart from a central axis of the column-shaped part object; and rotating each of the part objects about an X-axis which is perpendicular to the Y-axis so that the display surface of each of the part objects is directed toward the virtual camera when the virtual camera rotates about the X-axis while being directed toward the column-shaped part object.

Thus, even if the virtual camera is panned about the X-axis while being directed toward the model object, an image viewed as if the part objects exist over the column-shaped part object in all directions can be generated.

In the image generation method, the part objects may include a first part object and a second part object, the first and second part objects being adjacent each other, and the method may further comprise:

disposing the first and second part objects so as to overlap each other in a view image viewed from the virtual camera or intersect each other even when the virtual camera rotates 360 degrees about a given coordinate axis.

Thus, even if the virtual camera rotates 360 degrees about a given coordinate axis (Y-axis, X-axis or the like), a gap can be prevented from being created between the adjacent first and second part objects in the view image viewed from the virtual camera. As a result, a more natural and realistic image can be generated.

What is claimed is:

1. An image generation method for generating an image, the method comprising:

storing object data in an object data storage section;

disposing a plurality of objects in an object space, based on the object data stored in the object data storage section;

controlling a virtual camera;

generating an image viewed from the virtual camera in the object space while performing hidden surface removal processing;

disposing in the object space, a model object including a plurality of part objects each of which has a projection shape, a three-dimensional projecting portion and a display surface on which an image is drawn, the projecting portion extending at least in a direction perpendicular to the display surface, wherein a central part object included in the model object stands along a vertical central axis, and the rest of the part objects are positioned apart from the central axis of the central part object, the central axis extending through a center of the central part object; and rotating each of the part objects orbitally about the central axis, with a processor, based on rotational information of the virtual camera so that the display surface of each of the part objects is directed toward the virtual camera when the virtual camera orbitally rotates about the central axis while being directed toward the central part object.

2. The image generation method as defined in claim 1, the method further comprising:

storing a Z texture in which an offset value of a Z-value is set on each texel in a texture storage section;

mapping the Z texture stored in the texture storage section on each of the objects; and mapping on each of the part objects the Z texture for setting bump shapes on the display surface by pixel unit.

3. The image generation method as defined in claim 1, wherein the part objects include a first part object and a second part object, the first and second part objects being adjacent each other, the method further comprising:

disposing the first and second part objects so as to overlap each other in a view image viewed from the virtual camera or intersect each other even when the virtual camera rotates 360 degrees about a given coordinate axis.

4. The image generation method as defined in claim 1, wherein the central part object is columnar shaped.

5. An image generation method for generating an image comprising:
   storing object data in an object data storage section;
   disposing a plurality of objects in an object space, based on the object data stored in the object data storage section;
   generating the plurality of objects as three-dimensional objects including Z-texture values;
   storing a Z texture in which an offset value of a Z-value is set on each texel in a texture storage section;
   mapping the Z texture stored in the texture storage section on each of the objects;
   controlling a virtual camera;
   generating an image viewed from the virtual camera in the object space while performing hidden surface removal processing;
   disposing a model object having a plurality of part objects in the object space, the part objects each having a display surface and being three-dimensional objects extending at least in a direction perpendicular to the display surface, wherein a central part object included in the model object stands along a Y-axis, the Y-axis being an axis along a vertical direction, and the rest of the part objects are positioned apart from a central axis of the column-shaped part object;
   rotating each of the part objects about the Y-axis, with a processor, based on rotational information of the virtual camera so that a display surface of each of the part objects on which an image is drawn is directed toward the virtual camera when the virtual camera rotates about the Y-axis while being directed toward the central part object; and
   mapping on each of the part objects the Z texture for forming a virtual projection shape on the display surface of the part objects by pixel unit.

6. The image generation method as defined in claim 5, wherein the part objects include a first part object and a second part object, the first and second part objects being adjacent each other,
   the method further comprising:
   disposing the first and second part objects so as to overlap each other in a view image viewed from the virtual camera or intersect each other even when the virtual camera rotates 360 degrees about a given coordinate axis.

7. At least one of an optical disc, magnetic optical disc, magnetic disc, hard disc, magnetic tape and memory embedded with a program for generating an image, the program causing a computer to implement processing of:
   storing object data in an object data storage section;
   disposing a plurality of objects in an object space, based on the object data stored in the object data storage section;
   controlling a virtual camera;
   generating an image viewed from the virtual camera in the object space while performing hidden surface removal processing;
   disposing in the object space, a model object including a plurality of part objects each of which has a projection shape, a three-dimensional projecting portion and a display surface on which an image is drawn, the projecting portion extending at least in a direction perpendicular to the display surface, wherein a central part object included in the model object stands along a vertical central axis, and the rest of the part objects are positioned apart from the central axis of the central part object, the central axis extending through a center of the central part object; and
   rotating each of the part objects orbitally about the central axis based on rotational information of the virtual camera so that the display surface of each of the part objects is directed toward the virtual camera when the virtual camera orbitally rotates about the central axis while being directed toward the central part object.

8. The at least one of the optical disc, magnetic optical disc, magnetic disc, hard disc, magnetic tape and memory as defined in claim 7, the program causing a computer to implement processing of:
   storing a Z texture in which an offset value of a Z-value is set on each texel in a texture storage section;
   mapping the Z texture stored in the texture storage section on each of the objects; and
   mapping on each of the part objects the Z texture for setting bump shapes on the display surface by pixel unit.

9. The at least one of the optical disc, magnetic optical disc, magnetic disc, hard disc, magnetic tape and memory embedded with the program as defined in claim 7,
   wherein the part objects include a first part object and a second part object, the first and second part objects being adjacent each other,
   the program further causing a computer to implement processing of:
   disposing the first and second part objects so as to overlap each other in a view image viewed from the virtual camera or intersect each other even when the virtual camera rotates 360 degrees about a given coordinate axis.

10. At least one of an optical disc, magnetic optical disc, magnetic disc, hard disc, magnetic tape and memory embedded with a program for generating an image, the program causing a computer to implement processing of:
    storing object data in an object data storage section;
    disposing a plurality of objects in an object space, based on the object data stored in the object data storage section;
    generating the plurality of objects as three-dimensional objects including Z-texture values;
    storing a Z texture in which an offset value of a Z-value is set on each texel in a texture storage section;
    mapping the Z texture stored in the texture storage section on each of the objects;
    controlling a virtual camera;
    generating an image viewed from the virtual camera in the object space while performing hidden surface removal processing;
    disposing a model object having a plurality of part objects in the object space, the part objects each having a display surface and being three-dimensional objects extending at least in a direction perpendicular to the display surface, wherein a central part object included in the model object stands along a Y-axis, the Y-axis being an axis along a vertical direction, and the rest of the part objects are positioned apart from a central axis of the central part object;
    rotating each of the part objects about the Y-axis based on rotational information of the virtual camera so that a display surface of each of the part objects on which an image is drawn is directed toward the virtual camera when the virtual camera rotates about the Y-axis while being directed toward the central part object; and mapping on each of the part objects the Z texture for forming a virtual projection shape on the display surface of the part objects by pixel unit.

11. The at least one of the optical disc, magnetic optical disc, magnetic disc, hard disc, magnetic tape and memory embedded with the program as defined in claim 10,
wherein the part objects include a first part object and a second part object, the first and second part objects being adjacent each other,
the program further causing a computer to implement processing of:
disposing the first and second part objects so as to overlap each other in a view image viewed from the virtual camera or intersect each other even when the virtual camera rotates 360 degrees about a given coordinate axis.

12. An image generation method for generating an image, the method comprising:
storing object data in an object data storage section;
disposing a plurality of objects in an object space, based on the object data stored in the object data storage section;
controlling a virtual camera;
generating an image viewed from the virtual camera in the object space while performing hidden surface removal processing;
disposing in the object space, a model object including a plurality of part objects each of which has a projection shape, a three-dimensional projecting portion and a display surface on which an image is drawn, the projecting portion extending at least in a direction perpendicular to the display surface, wherein a central part object included in the model object stands along a vertical central axis, and the rest of the part objects are positioned apart from the central axis of the central part object, the central axis extending through a center of the central part object; and
rotating, with a processor, each of the part objects orbitally about an X-axis, which passes orthogonally through the central axis and extends in a direction orthogonal to a direction of sight line from the virtual camera, based on rotational information of the virtual camera so that the display surface of each of the part objects is directed toward the virtual camera when the virtual camera orbitally rotates about the X-axis while being directed toward the central part object.

13. An image generation method for generating an image comprising:
storing object data in an object data storage section;
disposing a plurality of objects in an object space, based on the object data stored in the object data storage section;
generating the plurality of objects as three-dimensional objects including Z-texture values;
storing a Z texture in which an offset value of a Z-value is set on each texel in a texture storage section;
mapping the Z texture stored in the texture storage section on each of the objects;
controlling a virtual camera;
generating an image viewed from the virtual camera in the object space while performing hidden surface removal processing;
disposing a model object having a plurality of part objects in the object space, the part objects each having a display surface and being three-dimensional objects extending at least in a direction perpendicular to the display surface, wherein a central part object included in the model object stands along a Y-axis, the Y-axis being an axis along a vertical direction, and the rest of the part objects are positioned apart from a central axis of the column-shaped part object;
rotating, with a processor, each of the part objects about an X-axis which is perpendicular to the Y-axis, based on rotational information of the virtual camera so that a display surface of each of the part objects on which an image is drawn is directed toward the virtual camera when the virtual camera rotates about the X-axis, which is perpendicular to the Y-axis while being directed toward the central part object; and
mapping on each of the part objects the Z texture for forming a virtual projection shape on the display surface of the part objects by pixel unit.

14. At least one of an optical disc, magnetic optical disc, magnetic disc, hard disc, magnetic tape and memory embedded with a program for generating an image, the program causing a computer to implement processing of:
storing object data in an object data storage section;
disposing a plurality of objects in an object space, based on the object data stored in the object data storage section;
controlling a virtual camera;
generating an image viewed from the virtual camera in the object space while performing hidden surface removal processing;
disposing in the object space, a model object including a plurality of part objects each of which has a projection shape, a three-dimensional projecting portion and a display surface on which an image is drawn, the projecting portion extending at least in a direction perpendicular to the display surface, wherein a central part object included in the model object stands along a vertical central axis, and the rest of the part objects are positioned apart from the central axis of the central part object, the central axis extending through a center of the central part object; and
rotating each of the part objects orbitally about an X-axis, which passes orthogonally through the central axis and extends in a direction orthogonal to a direction of sight line from the virtual camera, based on rotational information of the virtual camera so that the display surface of each of the part objects is directed toward the virtual camera when the virtual camera orbitally rotates about the X-axis while being directed toward the central part object.

15. At least one of an optical disc, magnetic optical disc, magnetic disc, hard disc, magnetic tape and memory embedded with a program for generating an image, the program causing a computer to implement processing of:
storing object data in an object data storage section;
disposing a plurality of objects in an object space, based on the object data stored in the object data storage section;
generating the plurality of objects as three-dimensional objects including Z-texture values;
storing a Z texture in which an offset value of a Z-value is set on each texel in a texture storage section;
mapping the Z texture stored in the texture storage section on each of the objects;
controlling a virtual camera;
generating an image viewed from the virtual camera in the object space while performing hidden surface removal processing;
disposing a model object having a plurality of part objects in the object space, the part objects each having a display surface and being three-dimensional objects extending at least in a direction perpendicular to the display surface, wherein a central part object included in the model object stands along a Y-axis, the Y-axis being an axis along a vertical direction, and the rest of the part objects are positioned apart from a central axis of the column-shaped part object;

rotating each of the part objects about an X-axis, which is perpendicular to the Y-axis, based on rotational information of the virtual camera so that a display surface of each of the part objects on which an image is drawn is directed toward the virtual camera when the virtual camera rotates about the X-axis while being directed toward the central part object; and mapping on each of the part objects the Z texture for forming a virtual projection shape on the display surface of the part objects by pixel unit.

* * * * *